(12) United States Patent
Elser et al.

(10) Patent No.: US 10,636,097 B2
(45) Date of Patent: *Apr. 28, 2020

(54) SYSTEMS AND MODELS FOR DATA ANALYTICS

(71) Applicant: Palantir Technologies Inc., Palo Alto, CA (US)

(72) Inventors: Jeremy Elser, New York, NY (US); Sebastian Caliri, San Francisco, CA (US); Katherine Sebastian, New York, NY (US); Dustin Janatpour, San Mateo, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 880 days.

This patent is subject to a terminal disclaimer.

(21) Appl. No.: 15/212,102

(22) Filed: Jul. 15, 2016

(65) Prior Publication Data

US 2017/0024824 A1  Jan. 26, 2017

Related U.S. Application Data

(63) Continuation of application No. 14/805,313, filed on Jul. 21, 2015, now Pat. No. 9,418,337.

(51) Int. Cl.
*G06Q 40/08* (2012.01)
*G06N 5/04* (2006.01)
(Continued)

(52) U.S. Cl.
CPC ......... *G06Q 40/08* (2013.01); *G06F 16/2468* (2019.01); *G06F 16/24578* (2019.01);
(Continued)

(58) Field of Classification Search
CPC ................ G06Q 40/08; G06F 16/2468; G06F 16/24578; G06N 5/04; G06N 7/00; G06N 7/005
See application file for complete search history.

(56) References Cited

U.S. PATENT DOCUMENTS

| 5,241,625 A | 8/1993 | Epard et al. |
| 5,670,987 A | 9/1997 | Doi et al. |

(Continued)

FOREIGN PATENT DOCUMENTS

| CN | 102546446 | 7/2012 |
| CN | 103167093 | 6/2013 |

(Continued)

OTHER PUBLICATIONS

"A Tour of Pinboard," <http://pinboard.in/tour> as printed May 15, 2014 in 6 pages.

(Continued)

*Primary Examiner* — Eric Nilsson
(74) *Attorney, Agent, or Firm* — Knobbe Martens Olson & Bear LLP

(57) ABSTRACT

Systems and methods are provided that allow for generating and applying an improved predictive data model that aggregates two or more models performed sequentially, for the purposes of improving the prediction of overall profitability of individuals or households in a population. The models may be generated by the processing of customer profitability data and third-party population data together. One of the two aggregated models may be an inherently probabilistic, binary model tasked with determining whether an individual is a high-loss individual and using that result to improve the predictive capability of the system.

20 Claims, 13 Drawing Sheets

(51) Int. Cl.
*G06N 7/00* (2006.01)
*G06F 16/2458* (2019.01)
*G06F 16/2457* (2019.01)

(52) U.S. Cl.
CPC .............. *G06N 5/04* (2013.01); *G06N 7/00* (2013.01); *G06N 7/005* (2013.01)

(56) References Cited

U.S. PATENT DOCUMENTS

| | | |
|---|---|---|
| 5,819,226 A | 10/1998 | Gopinathan et al. |
| 5,826,021 A | 10/1998 | Mastors et al. |
| 5,832,218 A | 11/1998 | Gibbs et al. |
| 5,845,300 A | 12/1998 | Comer |
| 5,878,434 A | 3/1999 | Draper et al. |
| 5,892,900 A | 4/1999 | Ginter et al. |
| 5,893,072 A * | 4/1999 | Zizzamia ............... G06Q 40/08 705/4 |
| 5,897,636 A | 4/1999 | Kaeser |
| 5,966,706 A | 10/1999 | Biliris et al. |
| 5,999,911 A | 12/1999 | Berg et al. |
| 6,006,242 A | 12/1999 | Poole et al. |
| 6,057,757 A | 5/2000 | Arrowsmith et al. |
| 6,065,026 A | 5/2000 | Cornelia et al. |
| 6,094,643 A | 7/2000 | Anderson et al. |
| 6,134,582 A | 10/2000 | Kennedy |
| 6,161,098 A | 12/2000 | Wallman |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,279,018 B1 | 8/2001 | Kudrolli et al. |
| 6,341,310 B1 | 1/2002 | Leshem et al. |
| 6,369,835 B1 | 4/2002 | Lin |
| 6,370,538 B1 | 4/2002 | Lamping et al. |
| 6,430,305 B1 | 8/2002 | Decker |
| 6,463,404 B1 | 10/2002 | Appleby |
| 6,505,196 B2 | 1/2003 | Drucker et al. |
| 6,519,627 B1 | 2/2003 | Dan et al. |
| 6,523,019 B1 | 2/2003 | Borthwick |
| 6,549,944 B1 | 4/2003 | Weinberg et al. |
| 6,714,936 B1 | 3/2004 | Nevin, III |
| 6,820,135 B1 | 11/2004 | Dingman |
| 6,839,745 B1 | 1/2005 | Dingari et al. |
| 6,944,821 B1 | 9/2005 | Bates et al. |
| 6,978,419 B1 | 12/2005 | Kantrowitz |
| 6,980,984 B1 | 12/2005 | Huffman et al. |
| 7,058,648 B1 | 6/2006 | Lightfoot et al. |
| 7,086,028 B1 | 8/2006 | Davis et al. |
| 7,139,800 B2 | 11/2006 | Bellotti et al. |
| 7,168,039 B2 | 1/2007 | Bertram |
| 7,171,427 B2 | 1/2007 | Witowski et al. |
| 7,174,377 B2 | 2/2007 | Bernard et al. |
| 7,213,030 B1 | 5/2007 | Jenkins |
| 7,278,105 B1 | 10/2007 | Kitts |
| 7,379,903 B2 | 5/2008 | Caballero et al. |
| 7,383,239 B2 * | 6/2008 | Bonissone ............ G06Q 40/00 706/20 |
| 7,392,254 B1 | 6/2008 | Jenkins |
| 7,403,942 B1 | 7/2008 | Bayliss |
| 7,418,431 B1 | 8/2008 | Nies et al. |
| 7,426,654 B2 | 9/2008 | Adams et al. |
| 7,441,182 B2 | 10/2008 | Beilinson et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,525,422 B2 | 4/2009 | Bishop et al. |
| 7,617,232 B2 | 11/2009 | Gabbert et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,716,077 B1 | 5/2010 | Mikurak |
| 7,725,547 B2 | 5/2010 | Albertson et al. |
| 7,756,843 B1 | 7/2010 | Palmer |
| 7,757,220 B2 | 7/2010 | Griffith et al. |
| 7,765,489 B1 | 7/2010 | Shah |
| 7,770,100 B2 | 8/2010 | Chamberlain et al. |
| 7,813,937 B1 | 10/2010 | Pathria et al. |
| 7,818,658 B2 | 10/2010 | Chen |
| 7,827,045 B2 | 11/2010 | Madill et al. |
| 7,877,421 B2 | 1/2011 | Berger et al. |
| 7,880,921 B2 | 2/2011 | Dattilo et al. |
| 7,899,796 B1 | 3/2011 | Borthwick et al. |
| 7,912,842 B1 | 3/2011 | Bayliss |
| 7,917,376 B2 | 3/2011 | Bellin et al. |
| 7,941,321 B2 | 5/2011 | Greenstein et al. |
| 7,941,336 B1 | 5/2011 | Robin-Jan |
| 7,958,147 B1 | 6/2011 | Turner et al. |
| 7,962,495 B2 | 6/2011 | Jain et al. |
| 7,962,848 B2 | 6/2011 | Bertram |
| 7,966,199 B1 | 6/2011 | Frasher |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,015,487 B2 | 9/2011 | Roy et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,073,857 B2 | 12/2011 | Sreekanth |
| 8,117,022 B2 | 2/2012 | Linker |
| 8,126,848 B2 | 2/2012 | Wagner |
| 8,214,232 B2 | 7/2012 | Tyler et al. |
| 8,214,490 B1 | 7/2012 | Vos et al. |
| 8,225,201 B2 | 7/2012 | Michael |
| 8,229,902 B2 | 7/2012 | Vishniac et al. |
| 8,230,333 B2 | 7/2012 | Decherd et al. |
| 8,290,838 B1 | 10/2012 | Thakur et al. |
| 8,301,464 B1 | 10/2012 | Cave et al. |
| 8,302,855 B2 | 11/2012 | Ma et al. |
| 8,364,642 B1 | 1/2013 | Garrod |
| 8,417,715 B1 | 4/2013 | Bruckhaus et al. |
| 8,429,527 B1 | 4/2013 | Arbogast |
| 8,473,454 B2 | 6/2013 | Evanitsky et al. |
| 8,484,115 B2 | 7/2013 | Aymeloglu et al. |
| 8,489,623 B2 | 7/2013 | Jain et al. |
| 8,489,641 B1 | 7/2013 | Seefeld et al. |
| 8,514,082 B2 | 8/2013 | Cova et al. |
| 8,515,912 B2 | 8/2013 | Garrod et al. |
| 8,527,461 B2 | 9/2013 | Ducott, III et al. |
| 8,538,827 B1 | 9/2013 | Dryer et al. |
| 8,554,579 B2 | 10/2013 | Tribble et al. |
| 8,554,719 B2 | 10/2013 | McGrew |
| 8,577,911 B1 | 11/2013 | Stepinski et al. |
| 8,578,500 B2 | 11/2013 | Long |
| 8,589,273 B2 | 11/2013 | Creeden et al. |
| 8,600,872 B1 | 12/2013 | Yan |
| 8,601,326 B1 | 12/2013 | Kirn |
| 8,620,641 B2 | 12/2013 | Farnsworth et al. |
| 8,639,522 B2 | 1/2014 | Pathria et al. |
| 8,639,552 B1 | 1/2014 | Chen et al. |
| 8,655,687 B2 * | 2/2014 | Zizzamia ............ G06Q 10/0635 705/4 |
| 8,666,861 B2 | 3/2014 | Li et al. |
| 8,682,696 B1 | 3/2014 | Shanmugam |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,732,574 B2 | 5/2014 | Burr et al. |
| 8,744,890 B1 | 6/2014 | Bernier |
| 8,798,354 B1 | 8/2014 | Bunzel et al. |
| 8,799,313 B2 | 8/2014 | Satlow |
| 8,812,960 B1 | 8/2014 | Sun et al. |
| 8,903,717 B2 | 12/2014 | Elliot |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 8,972,336 B2 | 3/2015 | Jagota |
| 8,984,390 B2 | 3/2015 | Aymeloglu et al. |
| 9,032,531 B1 | 5/2015 | Scorvo et al. |
| 9,058,315 B2 | 6/2015 | Burr et al. |
| 9,100,428 B1 | 8/2015 | Visbal |
| 9,105,000 B1 | 8/2015 | White et al. |

(56) References Cited

U.S. PATENT DOCUMENTS

| | | |
|---|---|---|
| 9,129,219 B1 | 9/2015 | Robertson et al. |
| 9,418,337 B1 | 8/2016 | Elser et al. |
| 9,760,840 B1* | 9/2017 | Tyagi .............. G06Q 10/06313 |
| 9,836,580 B2 | 12/2017 | Fendell et al. |
| 2001/0021936 A1 | 9/2001 | Bertram |
| 2001/0027424 A1 | 10/2001 | Torigoe |
| 2002/0032677 A1 | 3/2002 | Morgenthaler et al. |
| 2002/0035590 A1 | 3/2002 | Eibach et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0130907 A1 | 9/2002 | Chi et al. |
| 2002/0147805 A1 | 10/2002 | Leshem et al. |
| 2002/0174201 A1 | 11/2002 | Ramer et al. |
| 2003/0033347 A1 | 2/2003 | Bolle et al. |
| 2003/0036927 A1 | 2/2003 | Bowen |
| 2003/0093401 A1 | 5/2003 | Czahkowski et al. |
| 2003/0093755 A1 | 5/2003 | O'Carroll |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0163352 A1 | 8/2003 | Surpin et al. |
| 2003/0177112 A1 | 9/2003 | Gardner |
| 2003/0182313 A1 | 9/2003 | Federwisch et al. |
| 2003/0200217 A1 | 10/2003 | Ackerman |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0044648 A1 | 3/2004 | Anfindsen et al. |
| 2004/0083466 A1 | 4/2004 | Dapp et al. |
| 2004/0085318 A1 | 5/2004 | Hassler et al. |
| 2004/0088177 A1 | 5/2004 | Travis et al. |
| 2004/0095349 A1 | 5/2004 | Bito et al. |
| 2004/0111480 A1 | 6/2004 | Yue |
| 2004/0117387 A1 | 6/2004 | Civetta et al. |
| 2004/0126840 A1 | 7/2004 | Cheng et al. |
| 2004/0153418 A1 | 8/2004 | Hanweck |
| 2004/0153451 A1 | 8/2004 | Phillips et al. |
| 2004/0181554 A1 | 9/2004 | Heckerman et al. |
| 2004/0205492 A1 | 10/2004 | Newsome |
| 2004/0210763 A1 | 10/2004 | Jonas |
| 2004/0236688 A1 | 11/2004 | Bozeman |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0086207 A1 | 4/2005 | Heuer et al. |
| 2005/0091186 A1 | 4/2005 | Elish |
| 2005/0097441 A1 | 5/2005 | Herbach et al. |
| 2005/0108063 A1 | 5/2005 | Madill et al. |
| 2005/0125715 A1 | 6/2005 | Franco et al. |
| 2005/0131935 A1 | 6/2005 | O'Leary et al. |
| 2005/0133588 A1 | 6/2005 | Williams |
| 2005/0149455 A1 | 7/2005 | Bruesewitz et al. |
| 2005/0149527 A1* | 7/2005 | Berlin .................... G06Q 90/00 |
| 2005/0154628 A1 | 7/2005 | Eckart et al. |
| 2005/0154769 A1 | 7/2005 | Eckart et al. |
| 2005/0180330 A1 | 8/2005 | Shapiro |
| 2005/0182654 A1 | 8/2005 | Abolfathi et al. |
| 2005/0262512 A1 | 11/2005 | Schmidt et al. |
| 2006/0010130 A1 | 1/2006 | Leff et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0074866 A1 | 4/2006 | Chamberlain et al. |
| 2006/0080139 A1 | 4/2006 | Mainzer |
| 2006/0080316 A1 | 4/2006 | Gilmore et al. |
| 2006/0080619 A1 | 4/2006 | Carlson et al. |
| 2006/0129746 A1 | 6/2006 | Porter |
| 2006/0136513 A1 | 6/2006 | Ngo et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0178915 A1 | 8/2006 | Chao |
| 2006/0218206 A1 | 9/2006 | Bourbonnais et al. |
| 2006/0218491 A1 | 9/2006 | Grossman et al. |
| 2006/0241974 A1 | 10/2006 | Chao et al. |
| 2006/0253502 A1 | 11/2006 | Raman et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0011304 A1 | 1/2007 | Error |
| 2007/0038646 A1 | 2/2007 | Thota |
| 2007/0043686 A1 | 2/2007 | Teng et al. |
| 2007/0061259 A1 | 3/2007 | Zoldi et al. |
| 2007/0061752 A1 | 3/2007 | Cory |
| 2007/0067285 A1 | 3/2007 | Blume |
| 2007/0106582 A1 | 5/2007 | Baker et al. |
| 2007/0113164 A1 | 5/2007 | Hansen et al. |
| 2007/0136095 A1 | 6/2007 | Weinstein |
| 2007/0150801 A1 | 6/2007 | Chidlovskii et al. |
| 2007/0156673 A1 | 7/2007 | Maga |
| 2007/0168871 A1 | 7/2007 | Jenkins |
| 2007/0178501 A1 | 8/2007 | Rabinowitz et al. |
| 2007/0185867 A1 | 8/2007 | Maga |
| 2007/0192143 A1 | 8/2007 | Krishnan et al. |
| 2007/0233756 A1 | 10/2007 | D'Souza et al. |
| 2007/0239606 A1 | 10/2007 | Eisen |
| 2007/0245339 A1 | 10/2007 | Bauman et al. |
| 2007/0266336 A1 | 11/2007 | Nojima et al. |
| 2007/0271317 A1 | 11/2007 | Carmel |
| 2007/0284433 A1 | 12/2007 | Domenica et al. |
| 2007/0295797 A1 | 12/2007 | Herman et al. |
| 2007/0299697 A1 | 12/2007 | Friedlander et al. |
| 2008/0005063 A1 | 1/2008 | Seeds |
| 2008/0016155 A1 | 1/2008 | Khalatian |
| 2008/0046481 A1 | 2/2008 | Gould et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0091693 A1 | 4/2008 | Murthy |
| 2008/0103798 A1 | 5/2008 | Domenikos et al. |
| 2008/0103996 A1 | 5/2008 | Forman et al. |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0140576 A1 | 6/2008 | Lewis et al. |
| 2008/0155440 A1 | 6/2008 | Trevor et al. |
| 2008/0172257 A1 | 7/2008 | Bisker et al. |
| 2008/0172607 A1 | 7/2008 | Baer |
| 2008/0195417 A1 | 8/2008 | Surpin et al. |
| 2008/0195421 A1 | 8/2008 | Ludwig et al. |
| 2008/0195672 A1 | 8/2008 | Hamel et al. |
| 2008/0222038 A1 | 9/2008 | Eden et al. |
| 2008/0222295 A1 | 9/2008 | Robinson et al. |
| 2008/0228467 A1 | 9/2008 | Womack et al. |
| 2008/0235199 A1 | 9/2008 | Li et al. |
| 2008/0243711 A1 | 10/2008 | Aymeloglu et al. |
| 2008/0249820 A1 | 10/2008 | Pathria |
| 2008/0255973 A1 | 10/2008 | El Wade et al. |
| 2008/0263468 A1 | 10/2008 | Cappione et al. |
| 2008/0267386 A1 | 10/2008 | Cooper |
| 2008/0270316 A1 | 10/2008 | Guidotti et al. |
| 2008/0270438 A1 | 10/2008 | Aronson et al. |
| 2008/0281580 A1 | 11/2008 | Zabokritski |
| 2008/0281819 A1 | 11/2008 | Tenenbaum et al. |
| 2008/0301042 A1 | 12/2008 | Patzer |
| 2008/0313132 A1 | 12/2008 | Hao et al. |
| 2008/0313243 A1 | 12/2008 | Poston et al. |
| 2009/0018996 A1 | 1/2009 | Hunt et al. |
| 2009/0031401 A1 | 1/2009 | Cudich et al. |
| 2009/0043801 A1 | 2/2009 | LeClair |
| 2009/0055208 A1 | 2/2009 | Kaiser |
| 2009/0055487 A1 | 2/2009 | Moraes et al. |
| 2009/0070162 A1 | 3/2009 | Leonelli et al. |

(56) References Cited

U.S. PATENT DOCUMENTS

| | | |
|---|---|---|
| 2009/0076845 A1 | 3/2009 | Bellin et al. |
| 2009/0089651 A1 | 4/2009 | Herberger et al. |
| 2009/0094166 A1 | 4/2009 | Aymeloglu et al. |
| 2009/0106178 A1 | 4/2009 | Chu |
| 2009/0106242 A1 | 4/2009 | McGrew |
| 2009/0112678 A1 | 4/2009 | Luzardo |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132953 A1 | 5/2009 | Reed et al. |
| 2009/0150868 A1 | 6/2009 | Chakra et al. |
| 2009/0164387 A1 | 6/2009 | Armstrong et al. |
| 2009/0164934 A1 | 6/2009 | Bhattiprolu et al. |
| 2009/0177492 A1 | 7/2009 | Hasan et al. |
| 2009/0187546 A1 | 7/2009 | Whyte et al. |
| 2009/0187548 A1 | 7/2009 | Ji et al. |
| 2009/0198518 A1 | 8/2009 | McKenzie et al. |
| 2009/0199106 A1 | 8/2009 | Jonsson et al. |
| 2009/0216562 A1 | 8/2009 | Faulkner et al. |
| 2009/0222287 A1 | 9/2009 | Legorreta et al. |
| 2009/0228365 A1 | 9/2009 | Tomchek et al. |
| 2009/0240529 A1 | 9/2009 | Chess et al. |
| 2009/0248757 A1 | 10/2009 | Havewala et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070531 A1 | 3/2010 | Aymeloglu et al. |
| 2010/0070842 A1 | 3/2010 | Aymeloglu et al. |
| 2010/0070844 A1 | 3/2010 | Aymeloglu et al. |
| 2010/0070897 A1 | 3/2010 | Aymeloglu et al. |
| 2010/0082369 A1 | 4/2010 | Prenelus et al. |
| 2010/0082541 A1 | 4/2010 | Kottomtharayil |
| 2010/0082671 A1 | 4/2010 | Li et al. |
| 2010/0094765 A1 | 4/2010 | Nandy |
| 2010/0098318 A1 | 4/2010 | Anderson |
| 2010/0114817 A1 | 5/2010 | Broeder et al. |
| 2010/0114887 A1 | 5/2010 | Conway et al. |
| 2010/0122152 A1 | 5/2010 | Chamberlain et al. |
| 2010/0131502 A1 | 5/2010 | Fordham |
| 2010/0145909 A1 | 6/2010 | Ngo |
| 2010/0161735 A1 | 6/2010 | Sharma |
| 2010/0169192 A1 | 7/2010 | Zoldi et al. |
| 2010/0191563 A1 | 7/2010 | Schlaifer et al. |
| 2010/0204983 A1 | 8/2010 | Chung et al. |
| 2010/0223260 A1 | 9/2010 | Wu |
| 2010/0235915 A1 | 9/2010 | Memon et al. |
| 2010/0262688 A1 | 10/2010 | Hussain et al. |
| 2010/0280851 A1 | 11/2010 | Merkin |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0312837 A1 | 12/2010 | Bodapati et al. |
| 2010/0313239 A1 | 12/2010 | Chakra et al. |
| 2010/0324929 A1 | 12/2010 | Petrasich et al. |
| 2010/0325581 A1 | 12/2010 | Finkelstein et al. |
| 2011/0004626 A1 | 1/2011 | Naeymi-Rad et al. |
| 2011/0047159 A1 | 2/2011 | Baid et al. |
| 2011/0055074 A1 | 3/2011 | Chen et al. |
| 2011/0060753 A1 | 3/2011 | Shaked |
| 2011/0061013 A1 | 3/2011 | Bilicki et al. |
| 2011/0066497 A1 | 3/2011 | Gopinath et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0099628 A1 | 4/2011 | Lanxner et al. |
| 2011/0131122 A1 | 6/2011 | Griffin et al. |
| 2011/0153384 A1 | 6/2011 | Horne et al. |
| 2011/0161409 A1 | 6/2011 | Nair |
| 2011/0167105 A1 | 7/2011 | Ramakrishnan et al. |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0208724 A1 | 8/2011 | Jones et al. |
| 2011/0208822 A1 | 8/2011 | Rathod |
| 2011/0213655 A1 | 9/2011 | Henkin |
| 2011/0218955 A1 | 9/2011 | Tang |
| 2011/0225482 A1 | 9/2011 | Chan et al. |
| 2011/0225586 A1 | 9/2011 | Bentley et al. |
| 2011/0231305 A1 | 9/2011 | Winters |
| 2011/0246229 A1 | 10/2011 | Pacha |
| 2011/0252282 A1 | 10/2011 | Meek et al. |
| 2011/0258216 A1 | 10/2011 | Supakkul et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004894 A1 | 1/2012 | Butler |
| 2012/0011238 A1 | 1/2012 | Rathod |
| 2012/0011245 A1 | 1/2012 | Gillette et al. |
| 2012/0013684 A1 | 1/2012 | Robertson et al. |
| 2012/0019559 A1 | 1/2012 | Siler et al. |
| 2012/0022945 A1 | 1/2012 | Falkenborg et al. |
| 2012/0036434 A1 | 2/2012 | Oberstein |
| 2012/0054284 A1 | 3/2012 | Rakshit |
| 2012/0059853 A1 | 3/2012 | Jagota |
| 2012/0065987 A1 | 3/2012 | Farooq et al. |
| 2012/0066166 A1 | 3/2012 | Curbera et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084184 A1 | 4/2012 | Raleigh |
| 2012/0084287 A1 | 4/2012 | Lakshminarayan et al. |
| 2012/0131512 A1 | 5/2012 | Takeuchi et al. |
| 2012/0144335 A1 | 6/2012 | Abeln et al. |
| 2012/0158585 A1 | 6/2012 | Ganti |
| 2012/0159362 A1 | 6/2012 | Brown et al. |
| 2012/0173381 A1 | 7/2012 | Smith |
| 2012/0188252 A1 | 7/2012 | Law |
| 2012/0191446 A1 | 7/2012 | Binsztok et al. |
| 2012/0196558 A1 | 8/2012 | Reich et al. |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0246148 A1 | 9/2012 | Dror |
| 2012/0278249 A1 | 11/2012 | Duggal et al. |
| 2012/0310661 A1 | 12/2012 | Greene |
| 2012/0323888 A1 | 12/2012 | Osann, Jr. |
| 2012/0330973 A1 | 12/2012 | Ghuneim et al. |
| 2013/0006655 A1 | 1/2013 | Van Arkel et al. |
| 2013/0006668 A1 | 1/2013 | Van Arkel et al. |
| 2013/0016106 A1 | 1/2013 | Yip et al. |
| 2013/0046842 A1 | 2/2013 | Muntz et al. |
| 2013/0054306 A1 | 2/2013 | Bhalla |
| 2013/0057551 A1 | 3/2013 | Ebert et al. |
| 2013/0061169 A1 | 3/2013 | Pearcy et al. |
| 2013/0073377 A1 | 3/2013 | Heath |
| 2013/0096968 A1 | 4/2013 | Van Pelt et al. |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0110746 A1 | 5/2013 | Ahn |
| 2013/0117081 A1 | 5/2013 | Wilkins et al. |
| 2013/0124193 A1 | 5/2013 | Holmberg |

(56) References Cited

U.S. PATENT DOCUMENTS

| | | |
|---|---|---|
| 2013/0132348 A1 | 5/2013 | Garrod |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0224696 A1 | 8/2013 | Wolfe et al. |
| 2013/0226318 A1 | 8/2013 | Procyk |
| 2013/0226944 A1 | 8/2013 | Baid et al. |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Lizawa et al. |
| 2013/0262328 A1 | 10/2013 | Federgreen |
| 2013/0262527 A1 | 10/2013 | Hunter et al. |
| 2013/0263019 A1 | 10/2013 | Castellanos et al. |
| 2013/0276799 A1 | 10/2013 | Davidson |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0325826 A1 | 12/2013 | Agarwal et al. |
| 2014/0006404 A1 | 1/2014 | McGrew |
| 2014/0012724 A1 | 1/2014 | O'Leary et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0052466 A1 | 2/2014 | DeVille et al. |
| 2014/0058754 A1 | 2/2014 | Wild |
| 2014/0058763 A1 | 2/2014 | Zizzamia et al. |
| 2014/0058914 A1 | 2/2014 | Song et al. |
| 2014/0068487 A1 | 3/2014 | Steiger et al. |
| 2014/0081652 A1 | 3/2014 | Klindworth |
| 2014/0095363 A1 | 4/2014 | Caldwell |
| 2014/0095509 A1 | 4/2014 | Patton |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129936 A1 | 5/2014 | Richards et al. |
| 2014/0136237 A1 | 5/2014 | Anderson et al. |
| 2014/0136285 A1 | 5/2014 | Carvalho |
| 2014/0143009 A1 | 5/2014 | Brice et al. |
| 2014/0149130 A1 | 5/2014 | Getchius |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0214579 A1 | 7/2014 | Shen et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0244284 A1 | 8/2014 | Smith |
| 2014/0278339 A1 | 9/2014 | Aliferis et al. |
| 2014/0278479 A1 | 9/2014 | Wang et al. |
| 2014/0282177 A1 | 9/2014 | Wang et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0046481 A1 | 2/2015 | Elliot |
| 2015/0073929 A1 | 3/2015 | Psota et al. |
| 2015/0073954 A1 | 3/2015 | Braff |
| 2015/0085997 A1 | 3/2015 | Biage et al. |
| 2015/0095773 A1 | 4/2015 | Gonsalves et al. |
| 2015/0100897 A1 | 4/2015 | Sun et al. |
| 2015/0106379 A1 | 4/2015 | Elliot et al. |
| 2015/0134512 A1 | 5/2015 | Mueller |
| 2015/0135256 A1 | 5/2015 | Hoy et al. |
| 2015/0161611 A1 | 6/2015 | Duke et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0235334 A1 | 8/2015 | Wang et al. |
| 2015/0254220 A1 | 9/2015 | Burr et al. |
| 2015/0269316 A1 | 9/2015 | Hussam |
| 2015/0269334 A1 | 9/2015 | Fendell et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0034578 A1 | 2/2016 | Wang et al. |

FOREIGN PATENT DOCUMENTS

| | | |
|---|---|---|
| CN | 102054015 | 5/2014 |
| DE | 102014103476 | 9/2014 |
| DE | 102014204827 | 9/2014 |
| DE | 102014204830 | 9/2014 |
| DE | 102014204834 | 9/2014 |
| DE | 102014213036 | 1/2015 |
| EP | 1672527 | 6/2006 |
| EP | 1840523 | 3/2011 |
| EP | 2487610 | 8/2012 |
| EP | 2778913 | 9/2014 |
| EP | 2778914 | 9/2014 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2980748 | 2/2016 |
| GB | 2366498 | 3/2002 |
| GB | 2513472 | 10/2014 |
| GB | 2513721 | 11/2014 |
| GB | 2514239 | 11/2014 |
| GB | 2517582 | 2/2015 |
| NL | 2013134 | 1/2015 |
| WO | WO 01/025906 | 4/2001 |
| WO | WO 2001/088750 | 11/2001 |
| WO | WO 2005/116851 | 12/2005 |
| WO | WO 2008/113059 | 9/2008 |
| WO | WO 2009/051987 | 4/2009 |
| WO | WO 2009/061501 | 5/2009 |
| WO | WO 2010/030913 | 3/2010 |
| WO | WO 2010/030914 | 3/2010 |
| WO | WO 2010/030919 | 3/2010 |
| WO | WO 2012/119008 | 9/2012 |

OTHER PUBLICATIONS

Abbey, Kristen, "Review of Google Docs," May 1, 2007, pp. 2.
Acklen, Laura, "Absolute Beginner's Guide to Microsoft Word 2003," Dec. 24, 2003, pp. 15-18, 34-41, 308-316.
Adams et al., "Worklets: A Service-Oriented Implementation of Dynamic Flexibility in Workflows," R. Meersman, Z. Tani et al. (Eds.): OTM 2006, LNCS, 4275, pp. 291-308, 2006.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Anonymous, "A Real-World Problem of Matching Records," Nov. 2006, <http://grupoweb.upf.es/bd-web/slides/ullman.pdf> pp. 1-16.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Bluttman et al., "Excel Formulas and Functions for Dummies," 2005, Wiley Publishing, Inc., pp. 280, 284-286.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

(56) References Cited

OTHER PUBLICATIONS

Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Cohn, et al., "Semi-supervised clustering with user feedback," Constrained Clustering: Advances in Algorithms, Theory, and Applications 4.1 (2003): 17-32.
Conner, Nancy, "Google Apps: The Missing Manual," May 1, 2008, pp. 15.
Countly Mobile Analytics, <http://count.ly/> Printed Jul. 18, 2013 in 9 pages.
Delicious, <http://delicious.com/> as printed May 15, 2014 in 1 page.
DISTIMO—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
"E-MailRelay," <http://web.archive.org/web/20080821175021/http://emailrelay.sourceforge.net/> Aug. 21, 2008, pp. 2.
Flurry Analytics, <http://www.flurry.com/> Printed Jul. 18, 2013 in 14 pages.
Galliford, Miles, "SnagIt Versus Free Screen Capture Software: Critical Tools for Website Owners," <http://www.subhub.com/articles/free-screen-capture-software>, Mar. 27, 2008, pp. 11.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
"GrabUp—What a Timesaver!" <http://atichris.com/191/grabup/>, Aug. 11, 2008, pp. 3.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hibbert et al., "Prediction of Shopping Behavior Using a Huff Model Within a GIS Framework," Healthy Eating in Context, Mar. 18, 2011, pp. 16.
Hua et al., "A Multi-attribute Data Structure with Parallel Bloom Filters for Network Services", HiPC 2006, LNCS 4297, pp. 277-288, 2006.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
JetScreenshot.com, "Share Screenshots via Internet in Seconds," <http://web.archive.org/web/20130807164204/http://www.jetscreenshot.com/>, Aug. 7, 2013, pp. 1.
Johnson, Maggie "Introduction to YACC and Bison", Handout 13, Jul. 8, 2005, in 11 pages.
Johnson, Steve, "Access 2013 on demand," Access 2013 on Demand, May 9, 2013, Que Publishing.
Jul. 2015 Update Appendix 1: Examples published by the USPTO, 22 pages.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Kwout, <http://web.archive.org/web/20080905132448/http://www.kwout.com/> Sep. 5, 2008, pp. 2.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT-1> printed Aug. 4, 2011 in 1 page.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mixpanel—Mobile Analytics, <https://mixpanel.com/> Printed Jul. 18, 2013 in 13 pages.
Nadeau et al., "A Survey of Named Entity Recognition and Classification," Jan. 15, 2004, pp. 20.
Nin et al., "On the Use of Semantic Blocking Techniques for Data Cleansing and Integration," 11th International Database Engineering and Applications Symposium, 2007, pp. 9.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.

(56) References Cited

OTHER PUBLICATIONS

Online Tech Tips, "Clip2Net—Share files, folders and screenshots easily," <http://www.online-tech-tips.com/free-software-downloads/share-files-folders-screenshots/>, Apr. 2, 2008, pp. 5.
Open Web Analytics (OWA), <http://www.openwebanalytics.com/> Printed Jul. 19, 2013 in 5 pages.
O'Reilly.com, http://oreilly.com/digitalmedia/2006/01/01/mac-os-x-screenshot-secrets.html published Jan. 1, 2006 in 10 pages.
Piwik—Free Web Analytics Software. <http://piwik.org/> Printed Jul. 19, 2013 in 18 pages.
Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Schroder, Stan, "15 Ways to Create Website Screenshots," <http://mashable.com/2007/08/24/web-screenshots/>, Aug. 24, 2007, pp. 2.
Sekine et al., "Definition, Dictionaries and Tagger for Extended Named Entity Hierarchy," May 2004, pp. 1977-1980.
Sigrist, et al., "PROSITE, a Protein Domain Database for Functional Characterization and Annotation," Nucleic Acids Research, 2010, vol. 38, pp. D161-D166.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wikipedia, "Multimap," Jan. 1, 2013, https://en.wikipedia.org/w/index.php?title=Multimap&oldid=530800748.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
International Search Report and Written Opinion in Application No. PCT/US2009/056703 dated Mar. 15, 2010.
Notice of Acceptance for Australian Patent Application No. 2013251186 dated Nov. 6, 2015.
Notice of Allowance for U.S. Appl. No. 12/556,307 dated Jan. 4, 2016.
Notice of Allowance for U.S. Appl. No. 14/222,364 dated Jul. 27, 2017.
Notice of Allowance for U.S. Appl. No. 14/225,084 dated May 4, 2015.
Notice of Allowance for U.S. Appl. No. 14/265,637 dated Feb. 13, 2015.
Notice of Allowance for U.S. Appl. No. 14/304,741 dated Apr. 7, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/552,336 dated Nov. 3, 2015.
Notice of Allowance for U.S. Appl. No. 14/746,671 dated Jan. 21, 2016.
Notice of Allowance for U.S. Appl. No. 14/923,364 dated May 6, 2016.
Official Communication for Australian Patent Application No. 2013251186 dated Mar. 12, 2015.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014203669 dated May 29, 2015.
Official Communication for Canadian Patent Application No. 2831660 dated Jun. 9, 2015.
Official Communication for European Patent Application No. 09813700.3 dated Apr. 3, 2014.
Official Communication for European Patent Application No. 12181585.6 dated Sep. 4, 2015.
Official Communication for European Patent Application No. 14158958.0 dated Apr. 16, 2015.
Official Communication for European Patent Application No. 14158958.0 dated Jun. 3, 2014.
Official Communication for European Patent Application No. 14158977.0 dated Jun. 10, 2014.
Official Communication for European Patent Application No. 14158977.0 dated Apr. 16, 2015.
Official Communication for European Patent Application No. 14187996.5 dated Feb. 12, 2015.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1411984.6 dated Dec. 22, 2014.
Official Communication for Netherlands Patent Application No. 2011729 dated Aug. 13, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for Netherlands Patent Application No. 2013134 dated Apr. 20, 2015.

(56) References Cited

OTHER PUBLICATIONS

Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 624557 dated May 14, 2014.
Official Communication for New Zealand Patent Application No. 628161 dated Aug. 25, 2014.
Official Communication for U.S. Appl. No. 12/556,307 dated Oct. 1, 2013.
Official Communication for U.S. Appl. No. 12/556,307 dated Feb. 13, 2012.
Official Communication for U.S. Appl. No. 12/556,307 dated Mar. 14, 2014.
Official Communication for U.S. Appl. No. 12/556,307 dated Sep. 2, 2011.
Official Communication for U.S. Appl. No. 12/556,307 dated Jun. 9, 2015.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 13/949,043 dated Oct. 15, 2013.
Official Communication for U.S. Appl. No. 14/014,313 dated Jun. 18, 2015.
Official Communication for U.S. Appl. No. 14/141,252 dated Oct. 8, 2015.
Official Communication for U.S. Appl. No. 14/222,364 dated Jun. 24, 2016.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/265,637 dated Sep. 26, 2014.
Official Communication for U.S. Appl. No. 14/304,741 dated Mar. 3, 2015.
Official Communication for U.S. Appl. No. 14/304,741 dated Aug. 6, 2014.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/516,386 dated Feb. 24, 2016.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.

(56) References Cited

OTHER PUBLICATIONS

Official Communication for U.S. Appl. No. 14/813,749 dated Sep. 28, 2015.
Official Communication for U.S. Appl. No. 14/842,734 dated Nov. 19, 2015.
Official Communication for U.S. Appl. No. 14/923,374 dated Feb. 9, 2016.
Official Communication for U.S. Appl. No. 14/975,215 dated Jun. 21, 2017.
Official Communication for U.S. Appl. No. 14/975,215 dated Nov. 4, 2016.
Official Communication for U.S. Appl. No. 15/017,324 dated Apr. 22, 2016.
Official Communication for U.S. Appl. No. 15/181,712 dated Oct. 12, 2016.
Official Communication for U.S. Appl. No. 15/181,712 dated Jul. 5, 2017.
Definition "Identify" downloaded Jan. 22, 2015, 1 page.
Definition "Overlay" downloaded Jan. 22, 2015, 1 page.
Madden, Tom, "Chapter 16: The BLAST Sequence Analysis Tool," The NCBI Handbook, Oct. 2002, pp. 1-15.
Notice of Allowance for U.S. Appl. No. 14/805,313 dated Jun. 15, 2016.
Official Communication for European Patent Application No. 15156004.2 dated Aug. 24, 2015.
Official Communication for European Patent Application No. 15179122.5 dated Sep. 11, 2015.
Official Communication for Great Britain Patent Application No. 1404573.6 dated Sep. 10, 2014.
Official Communication for U.S. Appl. No. 13/831,791 dated Feb. 11, 2016.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/835,688 dated Sep. 30, 2015.
Official Communication for U.S. Appl. No. 13/835,688 dated Jun. 7, 2016.
Official Communication for U.S. Appl. No. 13/949,043 dated Jan. 15, 2016.
Official Communication for U.S. Appl. No. 13/949,043 dated May 7, 2015.
Official Communication for U.S. Appl. No. 14/170,562 dated Jul. 17, 2015.
Official Communication for U.S. Appl. No. 14/170,562 dated Mar. 19, 2014.
Official Communication for U.S. Appl. No. 14/170,562 dated Oct. 2, 2015.
Official Communication for U.S. Appl. No. 14/170,562 dated Sep. 25, 2014.
Official Communication for U.S. Appl. No. 14/170,562 dated Mar. 3, 2016.
Official Communication for U.S. Appl. No. 14/222,364 dated Dec. 9, 2015.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,596 dated May 9, 2016.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/449,083 dated Mar. 12, 2015.
Official Communication for U.S. Appl. No. 14/449,083 dated Oct. 2, 2014.
Official Communication for U.S. Appl. No. 14/449,083 dated Aug. 26, 2015.
Official Communication for U.S. Appl. No. 14/449,083 dated Apr. 8, 2016.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/805,313 dated Dec. 30, 2015.
Official Communication for U.S. Appl. No. 14/958,855 dated May 4, 2016.
Official Communication for U.S. Appl. No. 14/975,215 dated May 19, 2016.

* cited by examiner

Member Age by Profitability Grouping

| Profitability | 0-9 | 10-19 | 20-29 | 30-39 | 40-49 | 50-59 | 60-69 |
|---|---|---|---|---|---|---|---|
| High-loss | 8% | 8% | 12% | 14% | 16% | 24% | 18% |
| Small-loss | 32% | 30% | 15% | 11% | 8% | 3% | 1% |
| Profitable | 2% | 1% | 12% | 13% | 19% | 29% | 24% |
| Avg Member Profit ($) | -161 | -176 | -158 | -104 | -37 | 51 | 211 |

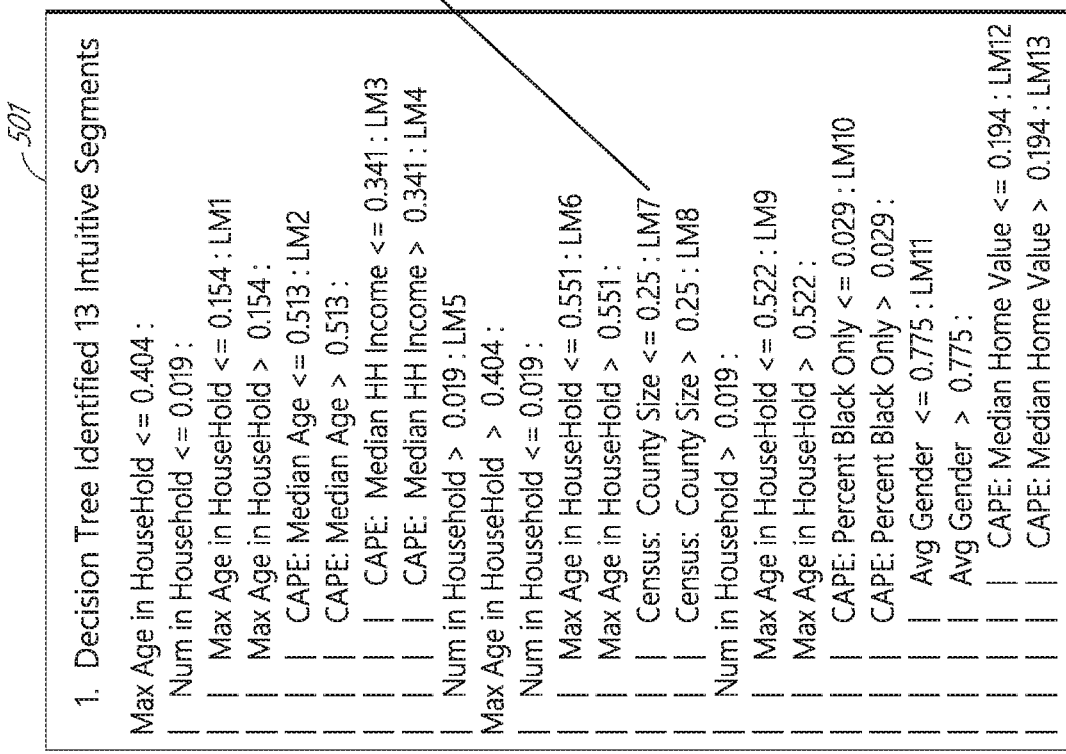

501

1. Decision Tree Identified 13 Intuitive Segments

Max Age in HouseHold <= 0.404 :
| Num in HouseHold <= 0.019 :
| | Max Age in HouseHold <= 0.154 : LM1
| | Max Age in HouseHold > 0.154 :
| | | CAPE: Median Age <= 0.513 : LM2
| | | CAPE: Median Age > 0.513 :
| | | | CAPE: Median HH Income <= 0.341 : LM3
| | | | CAPE: Median HH Income > 0.341 : LM4
| Num in HouseHold > 0.019 : LM5
Max Age in HouseHold > 0.404 :
| Num in HouseHold <= 0.019 :
| | Max Age in HouseHold <= 0.551 : LM6
| | Max Age in HouseHold > 0.551 :
| | | Census: County Size <= 0.25 : LM7
| | | Census: County Size > 0.25 : LM8
| Num in HouseHold > 0.019 :
| | Max Age in HouseHold <= 0.522 : LM9
| | Max Age in HouseHold > 0.522 :
| | | CAPE: Percent Black Only <= 0.029 : LM10
| | | CAPE: Percent Black Only > 0.029 :
| | | | Avg Gender <= 0.775 : LM11
| | | | Avg Gender > 0.775 :
| | | | | CAPE: Median Home Value <= 0.194 : LM12
| | | | | CAPE: Median Home Value > 0.194 : LM13

503

2. For members described by LM7 (Older, Rural)

LM7 Profitability Decile (Lower is More Profitable) =
+ 0.4192 * Census: County Size
+ 0.3811 * Max Age in HouseHold
+ 0.2252 * CAPE: Percent Asian Only
− 0.0964 * CAPE: % Marr Couple Fam W/O Kids
+ 0.0780 * CAPE: Percent Owner Occupied
− 0.0026 * Num in Household
+ 0.0025 * CAPE: Percent Hispanic
+ 0.0019 * CAPE: Median Household Income
+ 0.0012 * CAPE: Percent Spanish Speaking
− 0.0011 * Max Length of Residence
+ 0.0011 * Avg Number of Children in Living Unit
+ 0.0965

505

3. Example application:

Rural family with head of household aged 36 likely in 2nd decile.
Same family with head of household age 60 likely in 4th decile.

SYSTEMS AND MODELS FOR DATA ANALYTICS

INCORPORATION BY REFERENCE TO ANY PRIORITY APPLICATIONS

Any and all applications for which a foreign priority or domestic priority claim is identified in the Application Data Sheet as filed with the present application are hereby incorporated by reference under 37 CFR 1.57.

This application is a continuation of U.S. patent application Ser. No. 14/805,313 entitled "Systems And Models For Data Analytics", filed Jul. 21, 2015. This application is hereby incorporated by reference herein in its entirety.

TECHNICAL FIELD

The present disclosure relates to systems and techniques for data integration, analysis, and visualization. More specifically, embodiments of the present disclosure relate to aggregating two or more predictive data models performed sequentially for improved precision in predicting profitability of individual or household-level health insurance customers, and then providing that analytics information in an interactive user interface and a format specifically tailored to suit an end-user's needs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Companies typically perform customer analytics in order to improve the overall profitability of their business by obtaining a better understanding of their customers. In some industries, such as the health insurance industry, customers may generate a profit for the company, or they might cost the company a small or large amount of money depending on the insurance benefits the customer receives. In this scenario, the company might seek to minimize the number of customers that will end up costing a company a large amount of money.

SUMMARY OF THE DISCLOSURE

This disclosure inventively recognizes it is an important challenge for a company or organization to utilize the vast amounts of data available in order to predict, with great precision, the characteristics or behavior associated with an individual—such as their potential profitability or cost to the company.

The systems, methods, and devices described herein each have several aspects, no single one of which is solely responsible for its desirable attributes. Without limiting the scope of this disclosure, several non-limiting features will now be discussed briefly.

Improved systems and data models are disclosed herein that allow users to perform sequential regression models for improved predictability. The system described herein may be applied to any large dataset and not just in the context of the healthy insurance industry for the purposes of predicting overall profitability. The system can be applied to any industry or function in order to make improved predictions on a dependent variable.

In some embodiments, the system may be used to assist healthcare or health insurance providers in assessing the overall profitability of customers or potential customers. It may be used to identify individuals for managed care. It may also be used to identify individuals or households that are prone to disaster. The system may then output results that can be easily interpreted or visualized, and these results may be used to guide business decisions or strategy. As an example, the system may predict the overall profitability of all the individuals in a state, and then order the results from most-to-least profitable in order to guide customer acquisition efforts. The system may overlay the profitability of individuals or households over a map so that the profitability of different neighborhoods can be compared.

In some embodiments, the system may comprise a data model that can be applied to new cohorts or groups of individuals, whose data was not used in generating the data model itself. The data model may be powered by a machine learning algorithm or engine. The data model may actually be an aggregated data model that uses two or more separate models performed sequentially.

According to some embodiments, the system is a computing system for filtering and ordering a raw dataset comprising a large plurality of data for a population received by a computer network, the computing system comprising: a network interface that is coupled to a data network for receiving and transmitting one or more packet flows, the packet flows comprising: a first dataset containing a large plurality of data associated with individuals in a population, and a second dataset containing at least the values associated with the known profitability of individuals in a subset of the population. The computing system further comprising: a persistent memory configured to store datasets, including the first dataset and the second dataset; a computer processor; and a computer readable storage medium storing program instructions configured for execution by the computer processor in order to cause the computing system to: access the first dataset and the second dataset; identify the overlapping individuals present in both the first dataset and second dataset; combine the data from the first dataset and the second dataset corresponding to the overlapping individuals into a matched dataset; resample the matched dataset to randomly produce a test set and a proof set, wherein the test set and the proof set are both non-overlapping subsets of the matched dataset; generate an aggregate data model comprising a first model and a second model; validate the aggregate data model by comparing a known profitability of individuals in the proof set against a predicted profitability of individuals in the proof set, wherein the predicted profitability of individuals in the proof set is calculated by the aggregate data model; access a pipeline dataset containing a large plurality of data associated with a group of individuals; apply the profitability model in the aggregate data model to calculate the overall profitability of each individual from the group of individuals in the pipeline dataset; apply the second model to calculate the likelihood of disaster associated with each individual in the group of individuals from the pipeline dataset; filter out some of the individuals from the group of individuals in the pipeline dataset, according to the calculated likelihood of disaster associated with each individual; order the remaining individuals from the group of individuals in the pipeline dataset by their predicted profitability calculated from the first model; and present an ordered list of the remaining individuals ranked by their predicted profitability.

According to some embodiments, the large plurality of data in the first dataset comprises demographic data, geographical data, and/or behavioral data associated with individuals in a population. According to some embodiments, generating an aggregate data model comprising a first model and a second model involves a decision tree algorithm to perform a segmented linear regression on the test set. According to some embodiments, the first model is a profitability model and the second model is a high-loss binary model. According to some embodiments, the profitability model is configured to calculate the predicted profitability of an individual using data fields found in the test set for at least one independent variable. According to some embodiments, the profitability model is configured to calculate the predicted profitability of a household using data fields found in the test set for at least one independent variable. According to some embodiments, the high-loss binary model is configured to calculate the likelihood of disaster of an individual using data fields found in the test set for at least one independent variable, and is further configured to classify the individual as a disaster or a non-disaster based on the individual's calculated likelihood of disaster. According to some embodiments, the large plurality of data in the pipeline dataset comprises demographic data, geographical data, or behavioral data associated with a group of individuals. According to some embodiments, the matched dataset contains data associated with fewer individuals than the total individuals in the first dataset. According to some embodiments, identifying the overlapping individuals present in both the first dataset and the second dataset involves using a fuzzy-match on overlapping data fields between the first dataset and the second dataset. According to some embodiments, the overlapping data fields in the second dataset and the first dataset used in the fuzzy-match comprise at least one of: a name associated with an individual, an address associated with an individual, a postal code associated with an individual, and a phone number associated with an individual. According to some embodiments, the program instructions further cause the system to normalize values of the demographic data, geographical data, or behavioral data in the first dataset to be within zero and one prior to performing a fuzzy match between the second dataset and the first dataset. According to some embodiments, resampling the matched dataset to randomly produce a test set and a proof set results in a test set that is a subset of the matched dataset containing greater than approximately half of the data contained in the matched dataset, and a proof set that is a subset of the matched dataset containing less than approximately half of the data contained in the matched dataset. According to some embodiments, the program instructions further cause the computing system to visually present the profitability of at least one individual, household, and/or neighborhood on a map or user interface based on a corresponding address or location of the at least one individual, household, and/or neighborhood. According to some embodiments, the second model is a high-loss binary model that further applies a classification to each individual in the group of individuals from the pipeline dataset based on the calculated likelihood of disaster. According to some embodiments, filtering out some of the individuals from the group of individuals in the pipeline dataset according to the calculated likelihood of disaster associated with each individual further involves classifying each individual as a disaster or a non-disaster. According to some embodiments, the high-loss binary model is further configured to calculate the average likelihood of disaster in a group of individuals and compare it to an individual's calculated likelihood of disaster, in order to classify an individual as a disaster or a non-disaster based on the individual's calculated likelihood of disaster.

According to some embodiments, the system is a computing system configured to process data, generate a data model, and apply a data model, the computing system comprising: a network interface that is coupled to a data network for receiving and transmitting one or more packet flows; a persistent memory; a computer processor; and a computer readable storage medium storing program instructions configured for execution by the computer processor. The program instructions are configured for execution by the computer processor in order to cause the computing system to: access a first dataset containing demographic data associated with individuals in a population; access a second dataset containing values associated a known profitability of individuals in a subset of the population; identify the overlapping individuals present in both the first dataset and second dataset; combine the data from the first dataset and the second dataset that corresponds to the overlapping individuals into a matched dataset; resample the matched dataset to randomly produce a test set and a proof set; generate an aggregate data model on the test set, wherein the aggregate data model is comprised of a first model and a second model; validate the aggregate data model by comparing the known profitability of individuals in the proof set against the predicted profitability of individuals in the proof set, wherein the predicted profitability of individuals in the proof set is calculated by the aggregate data model; access a pipeline dataset containing demographic data associated with a group of individuals; apply the profitability model in the aggregate data model to calculate the overall profitability of each individual from the group of individuals in the pipeline dataset; apply the second model to calculate the likelihood of disaster associated with each individual in the group of individuals from the pipeline dataset; classify each individual in the group of individuals from the pipeline dataset as a disaster or a non-disaster; filter out some of the individuals classified by the second model as a disaster from the group of individuals in the pipeline dataset; order the remaining individuals from the group of individuals in the pipeline dataset by their predicted profitability calculated from the first model; and present an ordered list of the remaining individuals ranked by their predicted profitability.

According to some embodiments, the first dataset further comprises demographic data, geographical data, and/or behavioral data associated with individuals in a population. According to some embodiments, identifying the overlapping individuals present in both the first dataset and the second dataset involves using a fuzzy-match on overlapping data fields between the first dataset and the second dataset, wherein the overlapping data fields in the second dataset and the first dataset used in the fuzzy-match comprise at least one of: a name associated with an individual, an address associated with an individual, a postal code associated with an individual, and a phone number associated with an individual. According to some embodiments, the first model is a profitability model and the second model is a high-loss binary model. According to some embodiments, generating an aggregate data model involves using a decision tree algorithm to perform a segmented regression on the test set. According to some embodiments, the program instructions further cause the computing system to generate an easily-interpretable evaluation tool, wherein the easily-interpretable evaluation tool comprises a plot with a Y-axis representing predicted average profit of targeted households and a X-axis representing percentage of low-profit households excluded.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 1 illustrates a table with insurance membership age distributions for various profitability groupings.

FIG. 5 further illustrates a diagram showing how the improved data model can predict profitability of any individual in a population.

Figure 2:
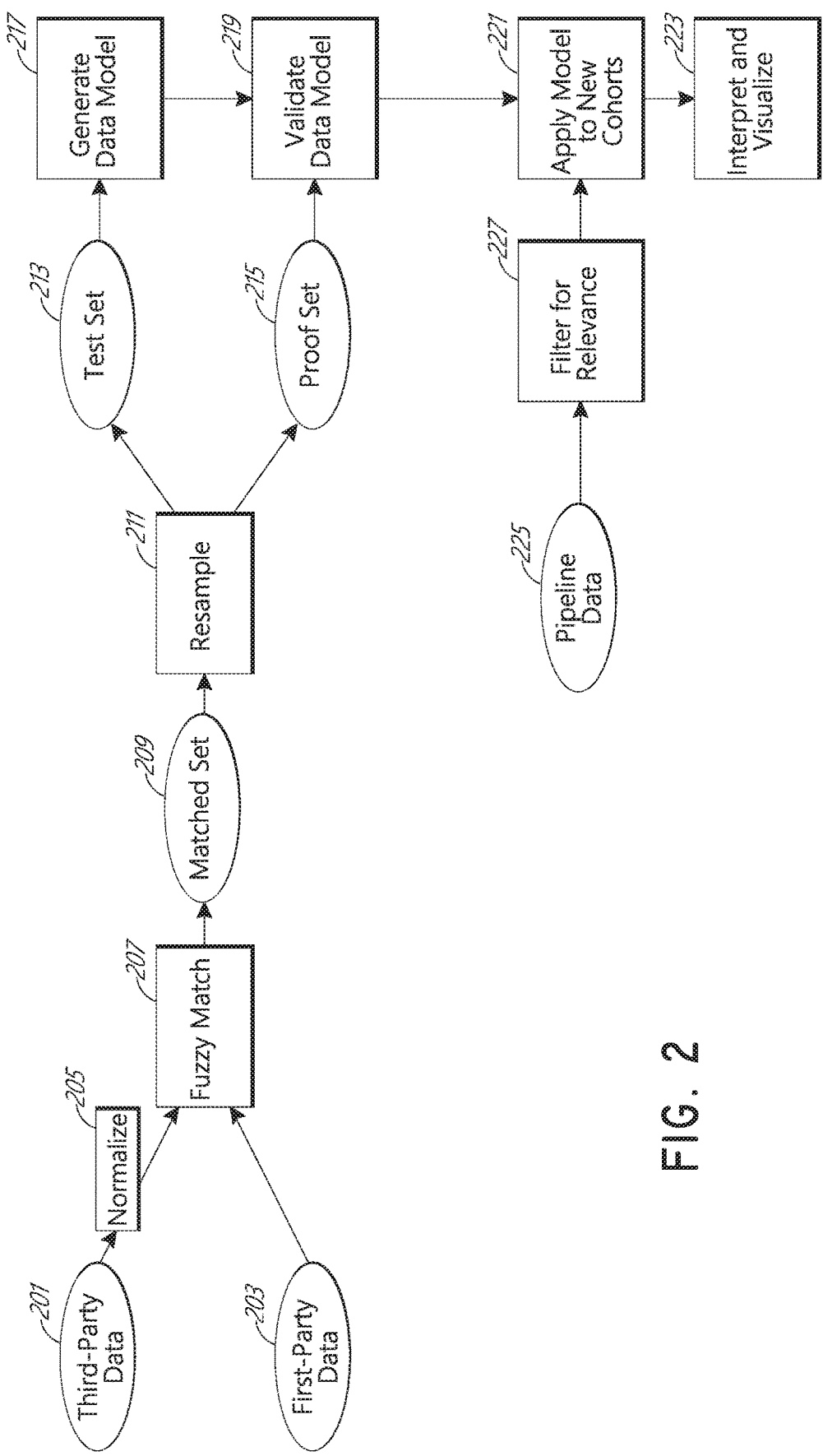
FIG. 2 illustrates a block diagram for a system that produces improved prediction of overall profitability according to one embodiment.

Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION OF SPECIFIC EMBODIMENTS

Definitions

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Database: A broad term for any data structure for storing and/or organizing data, including, but not limited to, relational databases (for example, Oracle database, mySQL database, and the like), spreadsheets, XML files, and text file, among others. The various terms "database," "data store," and "data source" may be used interchangeably in the present disclosure. A database may be stored in a tangible, fixed medium such as a hard drive, flash drive, optical disc, among others. Or a database may be stored in an intangible medium such as on a cloud computing platform as a cloud database. A database may have data stored in various locations.

Data Item (Item), Data Object (Object), or Data Entity (Entity): A data container for information representing a specific thing, or a group of things, in the world. A data item may be associated with a number of definable properties (as described below). For example, a data item may represent an item such as a person, a place, an organization, an account, a computer, an activity, a market instrument, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data item," "data object," "data entity," "item," "object," and "entity" may be used interchangeably and/or synonymously in the present disclosure.

Properties: Also referred to herein as "attributes" or "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Regression: Also referred to as a "regression analysis." A regression may refer to a statistical process for estimating the relationships among variables. It may refer to various techniques for modeling and analyzing several variables in order to determine the relationship between a dependent variable and one or more independent variables. It may help show how the value of a dependent variable changes as independent variable changes. It may be used to calculate the value of the dependent variable given known values for the independent variables. It may be used to calculate the conditional expectation of the dependent variable given the independent variables. A regression may be used to help understand or infer causal and/or correlative relationships between the dependent and independent variables.

Regression Function: A regression function may be the estimation target that is a function of the independent variables that is used in a regression. The regression function may be a result of various techniques. The regression function may be a result of a parametric regression, so that the regression function is defined in terms of a finite number of unknown parameters that are estimated from the data. This may include linear regression and ordinary least squares regression methods. The regression function may be a result of a nonparametric regression, such that the regression function may lie in a specified set of functions, which may be infinite-dimensional.

Data Model (Model): A data model may be a method of organizing data elements and standardizing how those data elements relate to each other. A data model may include a regression model or a method of performing a regression analysis. The data model may include the form or technique for a data gathering or generating process. The data model may include ways to interpolate or extrapolate values of variables. The data model may include methods of interpreting data or values generated by the model. The data model may organize the data and present it to a user relying on the model in a way that makes it easier for the user to interpret. The data model may consist of multiple components, or multiple models, which may or may not be modular in nature.

Machine Learning Algorithm: A machine learning algorithm is an algorithm that can make predictions on data. The machine learning algorithm may build a data model from examples inputs in order to make data-driven predictions or decisions. The machine learning algorithm may be used to perform predictive analytics or predictive modeling. A machine learning algorithm may be used by a computer in scenarios where it is infeasible to provide an explicit set of instructions or algorithm.

Non-Clinical Data or Non-Clinical Features: Non-clinical data refers to data that excludes clinical data. Clinical data refers to health or medical information that can only be collected during the course of ongoing patient care or as part of a formal clinical trial program. Clinical data may include data exclusive to electronic health records, administrative data, claims data, disease registries, healthy surveys, and clinical trials data, as some non-limiting examples. Non-clinical data does not contain this health related information for individuals, and may comprise data related to the demographics, geography, behavior, and various other characteristics of, individuals.

Member or Customer: Member and customer are used interchangeably herein. A member may be an entity that purchases goods or services from a company. A member may be someone who enters into a contract with an insurance company to pay insurance premiums over time, but receive certain insurance benefits depending on medical needs that may arise. A member or customer may refer to an individual, but it may also refer to the individuals in a household.

Cohort: A cohort is a group of individuals. A cohort may be a group of individuals within a population. The grouping of the individuals may be tightly defined. For example, a cohort may be three specific individuals named "Sally", "Mike", and "Steve." The grouping of individuals may be broadly defined. For example, a cohort may be all the individuals in a given state who are not currently existing customers. Thus, the grouping may be done based on various characteristics such as population, geography, status, and time, among other things.

Population: A population is a large group of individuals. This grouping of individuals may be based on a particular geographical area. For example, a population may consist of all the individuals in a given state. It may be even broader than that, such as the population of all the individuals in a country. It may be narrower than that, such as the population in a region, neighborhood, town, city, etc. There may be overlap in how a cohort or population may be defined, but generally a cohort is a smaller grouping or subset within a given population. For example, population may refer to all the individuals in a state, and a possible cohort may be all the individuals age 18-22 within that state.

Inventive Realizations

One way of performing customer analytics is through a linear regression analysis, which involves choosing various descriptor variables in order to produce a regression function used to predict a chosen outcome, such as the overall profitability of a customer. The corresponding data for the descriptor variables used to fit the regression function can be obtained from first-party or third-party datasets on the customers.

For example, a health insurance provider might choose to perform customer analytics in order to better predict the medical insurance profitability for a customer. One way to do this would be to choose customer characteristics—such as age, income, and location of the customer—with easily-obtainable datasets and have some degree of predictive capability towards the profitability of a customer. Then, a regression function can be curve-fit to the available data in order to predict how profitable an individual might be over time.

However, this approach of utilizing a single, simplistic model is poor at predicting medical insurance profitability. One problem is that a simple regression is unable to separate the highly-profitable individuals from the individuals who are disaster-prone and will cost the company a great amount, because both groups of individuals may have similar characteristics such as age distributions. For example, individuals between the ages of 40-70 may comprise both the bulk of the profitable customers and the bulk of the high-loss customers. Under a simplistic model, it will be difficult for an insurance company to discern between the profitable and high-loss individuals. It results in the company having to bear a great deal of risk in order to generate profits.

Thus, the present disclosure relates to advanced systems and methods, certain embodiments of which include the inventive realization that separating these high-loss individuals from the profitable individuals using non-clinical features and data can lead to better predictions of an individual's profitability as a medical insurance customer that can be leveraged to make effective business decisions. However, such a method would not need to be strictly applied to the medical insurance industry. It could also be used in any capacity where a simple regression model is insufficient or not reliable for providing precise predictions of an independent variable.

Certain embodiments also include the inventive realization that separating the high-loss individuals from the profitable individuals can be done by using an aggregated data model that utilizes two or more regression models. One of the models may calculate the profitability of an individual. The other model may be tasked with identifying the high-loss individuals or to identify individuals for managed care. Once identified, these individuals may be excluded, suppressed, or mitigated from a list or population of individuals.

Certain embodiments also include the inventive realization that identifying the high-loss individuals can be done using an inherently probabilistic, binary model. In some cases, this involves calculating a likelihood of disaster for an individual. That result may be then converted into a binary outcome of the individual flagged as either a disaster (i.e., a high-loss individual) or a non-disaster. Classifying the individuals as either a high-loss individual or not may be done by comparing the individual's likelihood of disaster to a baseline or threshold value. For example, an individual's likelihood of disaster may be compared to the average likelihood of disaster in a cohort or population. Individuals with a higher likelihood of disaster may then be classified as high-loss individuals.

Certain embodiments also include the inventive realization that identifying the high-loss individuals can be done using any kind of model, and not necessarily an inherently probabilistic, binary model. In some embodiments, identifying the high-loss individuals can be done using a trinary model such that individuals are classified into three groups: high-loss, medium-loss, or low-loss individuals. In some embodiments, the model used to identify the high-loss individuals classifies individuals into three, or more three, groups. In some embodiments, the model used to identify the high-loss individuals may be a profitability model or a decile model. The profitability model and the previously-mentioned disaster binary model represent extreme cases on the spectrum of available models that can be used to identify the high-loss individuals. The profitability model is the most granular and least accurate. It has high precision, but low statistical power. The disaster binary model is the least granular and most accurate. Any middle-ground option could instead be used as the model in identifying the high-loss individuals. For example, either a trinary or decile model would be more granular than a binary model, at the expense of accuracy. The example models provided in this paragraph (profitability, binary, trinary, decile) represent only some of the models that can be used in identifying the high-loss individuals and are not intended to be limiting.

Certain embodiments also include the inventive realization that results from the data model can be processed to be presented in a way that makes it easier for an end user to analyze and make effective business decisions. Some embodiments will order the individuals in a cohort by each individual's predicted profitability, such that it is easily ascertainable which individuals are the most profitable in a cohort.

Thus, various embodiments of the present disclosure provide improvements to various technological fields. For example, as described above, existing systems for predictive modeling (including those used in the health insurance or health care fields for the purposes of predicting a customer's profitability) are limited in various ways (they lack precision and reliability in separating out closely-related types of individuals), and various embodiments of the disclosure provide significant improvements over such technology. However, such improvements can be applied to various technological fields. For example, given enough data about the long-term performance of used cars, a predictive data model could be applied to used cars to help separate out the "lemons", or disaster-prone cars, from the cars that provide good value over their remaining lifespan. Additionally, various embodiments of the present disclosure are inextricably tied to computer technology. In particular, various embodiments rely on presentation of results via an interactive graphical user interface. Such features are intimately tied to, and enabled by, computer technology, and would not exist except for computer technology. For example, the interactions with the data described below in reference to various embodiments cannot reasonably be performed by humans alone, without the computer technology upon which they are implemented. Further, the implementation of the various embodiments of the present disclosure via computer technology enables many of the advantages described herein, including improved precision of predictions and more efficient processing, interaction, and presentation of various types of data.

Overview

FIG. 1 illustrates an obstacle for health insurance companies seeking to perform customer analytics on profitability by presenting a table with member age distributions for various profitability groupings.

The profitability groupings are high-loss grouping 101, small-loss grouping 103, and profitable grouping 105. These profitability groupings are reflective of the member base for health insurance companies and reflect the monetary outcomes for each member. Over the long-term, a member may be profitable for an insurance company if the member pays more in premiums than they receive in benefits. A member may also cost the insurance company a small amount by receiving more benefits than the premium they pay. There are also member who are high-loss member because they are on the receiving end of a medical disaster and end up receiving much more in benefits than the premium they pay. The table in FIG. 1 divides member age into seven age ranges. Members fall into one of the following seven ranges: ages 0-9, ages 10-19, ages 20-29, ages 30-39, ages 40-49, ages 50-59, and ages 60-69. For each age range, the table presents the average member profit 107, which is the average profitability for a member in each age range expressed as an actual dollar amount.

As FIG. 1 shows, average member profit 107 tends to increase with age range. Older members tend to be more profitable for insurance companies. This is further reflected in the table, where it can be seen that members between the ages of 0-29 make up the majority of the small-loss grouping 103. However, the table also illustrates that members between the ages of 40-69 make up the majority of both the high-loss grouping 101 and profitable grouping 105. So while older members tend to be more profitable for insurance companies, the members that cost the insurance companies the most money also tend to be the older members. As a result, risk and profit go hand-in-hand for insurance companies, who simultaneously bear the risk of the high-loss grouping 101 in order to make profits from the profitable grouping 105. Thus, an insurance company has much to gain if they could use non-clinical features or data in creating a data model that can separate the high-loss members from the profitable members in advance of predicting the overall profitability of an individual.

Although clinical data can be used, the use of non-clinical data is preferred for two reasons. First, clinical history only exists for existing members for an insurance company. The use of clinical history would allow only for predicting the profitability of existing members, limiting the use of a predictive model for new or potential customers. Second, a limited clinical history may be only informative in the short-term, and thus misleading in comparison to the use of demographics data when predicting long-term profitability.

One technique that would be well-suited for predicting overall profitability may be a segmented linear regression. A segmented linear regression is a piecewise regression that partitions all the various independent variables into intervals and fits a separate line segment to each interval. A segmented regression is particularly useful when the independent variables, once clustered into different segments or groups, possess different relationships between themselves in each segment or region. The added complexity of a segmented regression can be worth the potentially improved predictive capability.

FIG. 2 is a general overview of the improved system for predicting overall profitability. Third-party data 201 may be a broad database obtained from a third-party that contains data corresponding to various descriptor variables that are used in generating the model. In some embodiments, third-party data 201 may consist of state-wide demographic, behavioral, or regional information. Third-party data 201 is first normalized 205 in order to make the data values for all the individuals in the dataset between 0 and 1, which allows for a better comparison between the individuals.

First-party data 203 is a database that contains known values of the dependent variable that the model is attempting to predict. First-party data 203 also contains values for the descriptor variables chosen. The individuals in first-party data 203 may be a subset of the individuals in third-party data 201. In some embodiments, first-party data 203 may be a database that contains the actual, known profitability of existing members or health insurance customers.

A matched set 209 is then produced, where the third-party data 201 is matched to each individual member whose actual profitability is contained within first-party dataset 203. Third-party data for non-members, or for individuals who are unable to be matched to an actual profitability contained within first-party data 203, would play no role in generating the data model and would be temporarily cast aside. However, it should be noted that the third-party data for non-members becomes useful once the data model has been generated. Since the descriptor variables for the model are generated from the third-party data 201, which can be a state-wide database containing demographic data, any individual in the database for third-party data 201 can be scored for profitability regardless of whether they are a member or not. This is a big advantage to using a matched set comprising third-party data 201 and first-party data 203 over only the use of first-party data 203 on the company's own customers.

In order to produce this matched set, third-party data 201 and first-party data 203 undergo a fuzzy match 207. A fuzzy match is performed here to match individuals between the two datasets by matching name and location. The third-party data 201 is married to the first-party data 203 using keys such as first name, last name, and address fields such as postal code. The goal for the system is to attempt to match or correspond the third-party data for a specific individual to that individual's first-party data containing known profitability. Fuzzy matching allows word-based matching queries to find matching phrases or sentences from a database. When an exact match is not found for a sentence or phrase, fuzzy matching searches a database to find derivatives with an approximate match in meaning or spelling. Possible approximate matches for the queried word are returned with a matching percentage between a threshold percentage and 100 percent. In other words, fuzzy matching would return a match which, although is not a 100 percent match, is above the threshold matching percentage set by the user of the system.

For example, the model may be attempting to calculate the profitability of a customer listed under the name "John Smith." However, the data obtained from a third-party provider may include data for that specific person under the name "Johnathan Smith." In order for the third-party data needs to be matched up with the first-party data for this person, the system may recognize that the first names "Johnathan" and "John" are close enough such that the matching percentage is above a certain threshold, which may suggest the data pair refers to a singular individual.

After producing matched set 209, the matched set 209 is resampled 211 at random in order to produce a test set 213 and a proof set 215. Resampling 211 compensates for the fact that the fuzzy matching process may be biased, and it forces the matched individuals in the matched set 209 to resemble the state-wide population or population presented in third-party data 201.

Test set 213 is then used to generate the data model 217. Generating data model 217 and powering the model can be done using various machine learning techniques or engines, with the ultimate goal of predicting individual or household profitability based on non-clinical risk factors. These machine learning techniques can predict profitability with high precision through the combined use of an external, third-party dataset 201 and an internal, first-party dataset 203. As more data is provided to the algorithm in the test set 213, the model becomes more precise. In various embodiments, the machine learning regression technique may be a decision tree, random forest, support vector machine, or neural network. The machine learning regression technique may be performed with or without adaptive boosting. In some embodiments, the model may be comprised of various machine learning engines that may be tested, evaluated, and re-evaluated as new data becomes available, in order to choose the optimal engine that produces the best results. Multiple machine learning techniques may be combined in an ensemble that allows multiple models to vote on a final outcome. In some embodiments, the data model is powered using a decision tree engine (a generic machine learning optimizer) as the specific machine learning algorithm.

In some embodiments, the data model generated may be based on a segmented regression. In some embodiments, the data model generated may actually be an aggregated model. In some embodiments, this aggregated model may be two or more segmented regression models with different dependent variables, performed sequentially in order to produce more precise results. The dependent variables may be different, but related in some way. For example, recall that one issue faced by insurance companies is that high-loss individuals are difficult to distinguish from profitable individuals. This system can get around that problem through the use of two or more segmented regression models performed sequentially. For example, an aggregated model with two models would use a first model that predicts profitability of each individual, and a second model that is designed with a simpler task of predicting whether an individual will be a disaster. Each individual is essentially scored twice, once by each model, and the second model is used to filter out the predicted high-loss individuals. Here, the first and second models are predicting two related, but distinct, outcomes. The first model predicts profitability with high precision, but low statistical power. The second model predicts disaster with lower precision, but high statistical power. The pairing of the first and second models in this manner as disclosed represents a great improvement over simply using multiple generic models, which would face difficulty in separating the profitable and high-loss individuals.

There are many options for the different models chosen to be included in the aggregated model, and a specific type of model can be chosen for a specific task. Combining models with specific tasks in this manner can lead to improved results over just combining generic models or choosing models at random. A profitability model has high precision but low statistical power, but it can be utilized with additional models that have higher statistical power when more accuracy is needed. These additional models with higher statistical power are helpful in determining disaster-prone individuals, but may be insufficient on their own in predicting profitability. Some examples of such models could include profitability, decile, trinary, or binary models. Thus, a binary model could be used to classify individuals as high-loss individuals or not high-loss individuals. Or more granularity and precision may be desired, so a trinary model could be chosen that has three groupings. Individuals could be classified into three categories, such as high-loss, medium-loss, or low-loss individuals. The categories, classifications, or groupings can be defined in any manner based on the model's specific task. If more granularity and precision is desired, additional categories, classifications, or groupings can be introduced into the model. Thus, instead of a trinary model, a quaternary model (with four classifications), decile model, or profitability model may be used, and so forth.

After the model is generated in step 217, the data model can be validated at step 219 using the proof set 215, which was not utilized in generating the data model 217. The model is applied to proof set 215 to produce predicted profitability for the individuals in the proof set 215. The predicted profitability can be compared against the actual, known profitability of these individuals in proof set 215, since proof set 215 is comprised of some of the first-party data 203 containing actual profitability.

Once the model has been properly evaluated, the model can be applied to new cohorts 221. This is accomplished by taking pipeline data 225, which typically contains the same data fields or variables present in third-party data 201 that were used as descriptor variables in generating the data model. Thus, pipeline data 225 can consist of the existing third-party data for individuals that are not in matched set 209. This illustrates how the model can be immediately applied to the non-member individuals in third-party data 201. However, pipeline data 225 can also consist of an entirely new dataset. For example, if the data model was generated using 2014 data, then pipeline data can be more-recent population data from 2015. This pipeline data 225 may be first filtered for relevance 227 before being inputted into the model. Filter for relevance 227 is an optional step that can be used to filter and limit pipeline data that is overly broad. Filtering would allow for testing of desired subpopulations (such as new members, applications, leads, or the remaining state population that are not customers). For example, the pipeline data may contain state-wide population data from the last decade but can be filtered in order to only look at 2015 population data for non-members, in order to generate possible leads.

Afterwards, the model would produce predictive results for the new cohorts. Those results can be displayed to the end user to interpret and visualize 223. For instance, the results can be displayed after being ranked and ordered by profitability. The results can be displayed on a map when paired with address data. This can all be achieved using a user-friendly graphical user interface that allows an end user to use the results without having played a role in generating or validating the data model.

Segmentation and Decision Tree Modeling

Figure 3:
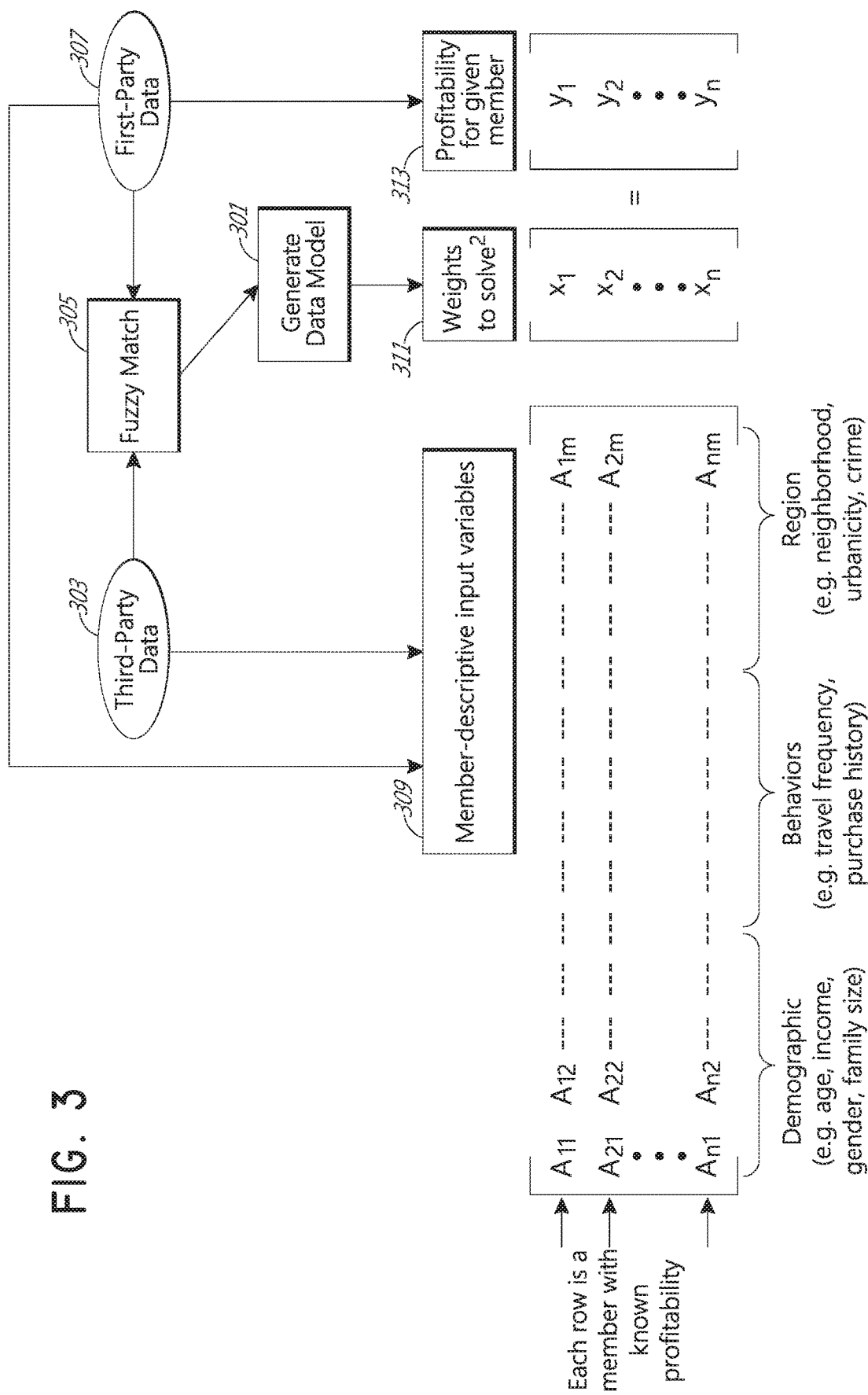
FIG. 3 is a flow chart that depicts how an improved data model may be generated.

FIG. 3 illustrates how a data model 301 may be generated by performing a segmented linear regression on multivariate data for existing members. In FIG. 3, data model 301 is a decision tree model that is generated using a matched-set of first-party data 307 and third-party data 303 for existing members.

First-party data 307 may contain the actual profitability for each existing member 313, which can be expressed as a matrix. Similarly, third-party data 303 and first-party data 307 may contain all the data fields for member-descriptive input variables 309, which may be visualized as a matrix of all the information for the descriptor variables. The descriptor variables are the independent variables which identify the individuals, and they are typically identified and included in a data model for their potential predictive capability. As an example, the descriptor variables may consist of demographic characteristics of the individuals along with the family or household they belong to (e.g., age, income, gender, family size), the behavioral characteristics of the individual (e.g., their travel frequency, purchase history, risk-seeking propensity), and the regions or settings that observations are made (surrounding properties, neighborhoods, cultures, urbanicity, crime).

Combining third-party data 303 and first-party data 307 into a matched-set may first involve data processing 305. Step 305 may include normalizing the third-party data 303, performing a fuzzy match, and resampling into a proof set and a test set. The test set may be used to generate the data model 301.

As can be seen from the figure, in order to generate data model 301 based on a linear regression, the weights for the descriptor variables in weights to solve 311 need to be solved for. However, there is an added step in a segmented regression. The decision tree model firsts attempt to autosegment the various descriptor variables, such as age, by identifying intuitive segments and placing each individual into a segment. Afterwards, the decision tree model would then solve for the weights shown in weights to solve 309 for each segment, allowing for the creation of a linear regression model for each segment. Thus, FIG. 3 illustrates only the generation of the data model. In this step, one or more segmented regression functions are fitted and generated from the available first-party and third-party data.

Although not pictured in this figure, after the data model is generated it may then be applied and ultimately used to not only predict the overall profitability of existing members, but to predict the overall profitability of the individuals or households in a population—including the profitability of non-members—as well. The model may be capable of further ranking, ordering, and filtering individuals based on their predicted overall profitability.

Figure 4:
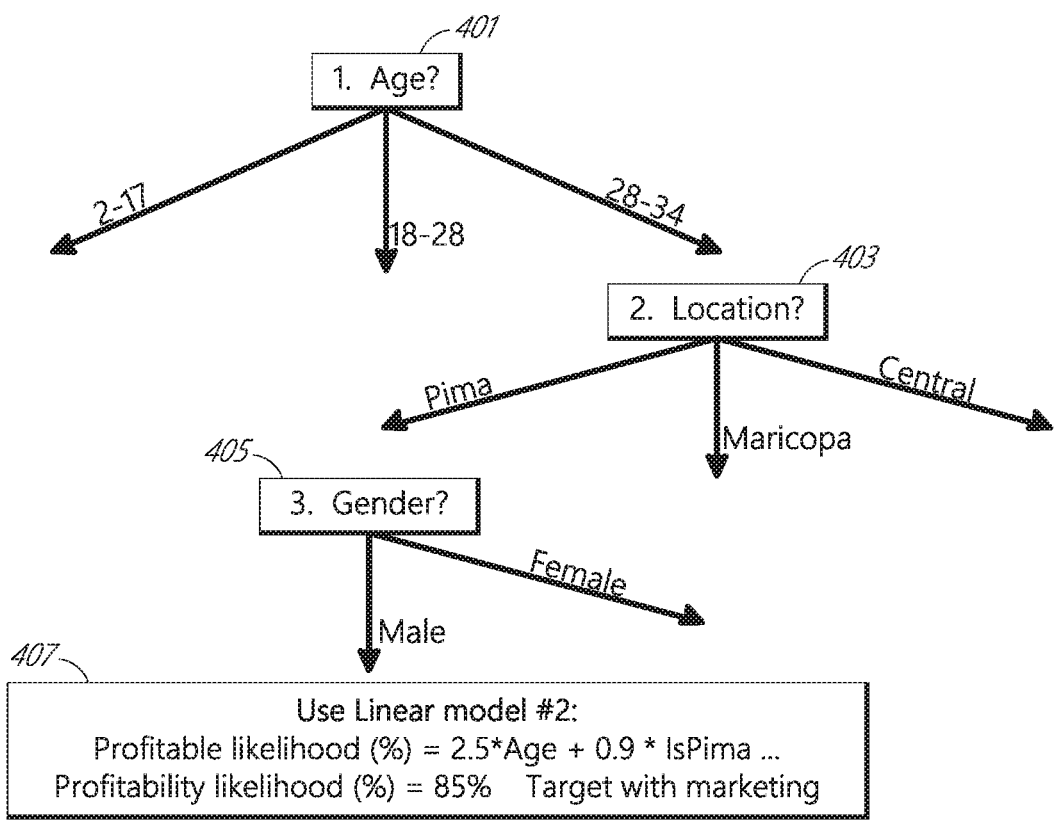
FIG. 4 illustrates a diagram showing how the improved data model can predict profitability of any individual in a population.

FIG. 4 illustrates how a segmented regression based on a decision tree model could be used in order to apply the discovered relationships to calculate the profitability of any individual in the general population (and not just existing members). In this example, the model could be applied to predict the profitability of a 30 year old male located within Pima.

At the age inquiry step 401, the decision tree evaluates the age of the individual. Since the individual's age of 30 falls into the 28-34 bucket, the decision tree goes onto the next step which is location inquiry 403. The decision tree determines that the individual is located in Pima and then goes onto the next step, which is gender inquiry 405. After determining the individual is a male, the decision tree is able to place the individual within the segment corresponds to linear model #2. Linear model #2 is then applied to this specific individual at step 407 to make a prediction. In this manner, the decision tree is mapped out for the various segments and their corresponding linear models.

At step 407, the values for the individual are plugged into the regression function with the solved weights for that segment. The result is a profitability likelihood of 85%, which may be above some set threshold that flags the individual to be automatically targeted with marketing materials based on their high profitability likelihood. However, this expression of profitability is not meant to be a limiting example of how profitability can be expressed; the overall profitability can be expressed by the model in various ways. In some embodiments, the overall profitability can be expressed as an exact profitability in dollar amounts that the person would potentially earn or cost the company. The overall profitability may also be presented as a profitability score, based on a monotone function that preserves the ranking and order of profitability for a dataset. Or the overall profitability may be expressed as a profitability decile or percentile.

FIG. 5 further illustrates an example of how segmented regression can be used in a data model to predict profitability. The decision tree segmentation 501 results can be seen in the figure. The decision tree identified thirteen intuitive segments, which are listed in bold with the format: LM #. For example, linear model 1 is shown as "LM1" and it is the linear model generated for a segment where the normalized max age in the household <=0.154 and the normalized number of people in the household <=0.019.

In the figure, linear model 7 or "LM7" is described in more detail to show the actual weights solved by the model in the description of linear model seven 503. Description of linear model seven 503 shows how the segment covers individuals that are typically older and live in rural areas, with the criteria for the segment defined as normalized max age in the household >0.551 and normalized for a census-reported county size of <=0.25. The various weights for the different descriptor variables can be seen in the description of linear model seven 503.

Linear model seven represents the equation for which the values for a given household can be inputted in order to calculate a profitability decile (with lower value being more profitable), so long as the individual meets the criteria for fitting under that segment. In the description of example application 505, two examples are provided that are older, rural households that linear model seven can be applied to. All other things held equal between the two examples, a rural family with a head of household aged 36 could be calculated to be within the second decile for profitability (i.e., more profitable) than the same family with a head of household age 60, which would be in the fourth decile for profitability.

Testing the Model

Figure 6:
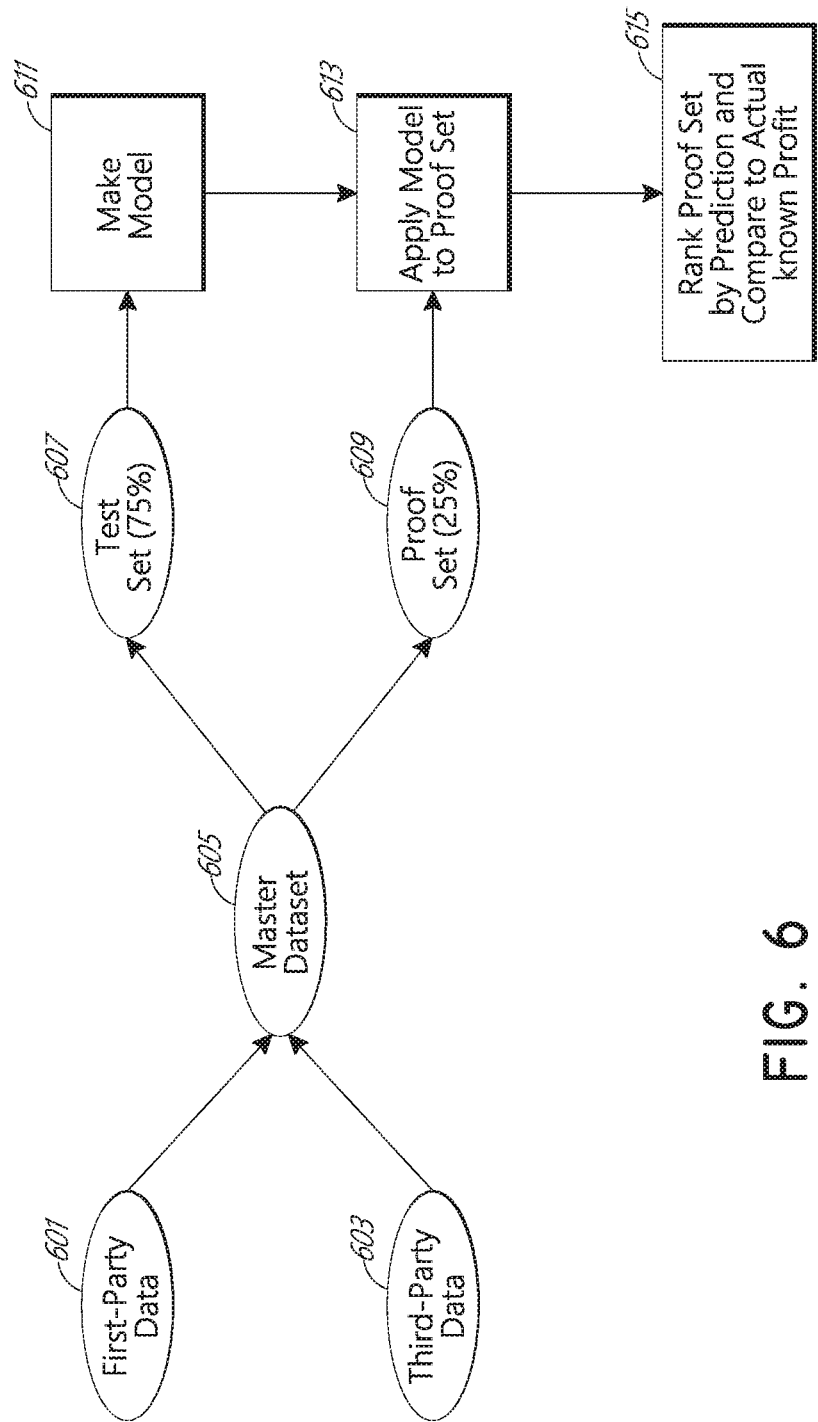
FIG. 6 illustrates a flow chart detailing how the improved data model may be tested and evaluated.

FIG. 6 illustrates in further detail how the predictive data model may be tested and evaluated. First, the first-party data 601 and third-party data 603 is combined into a matched, master dataset 605, using methods such as normalizing and fuzzy matching as previously described herein. This combined, "supervised" master dataset 605 is then randomized and resampled into a test set 607 and a proof set 609. Resampling compensates for the fact that the fuzzy matching process may be biased and forces the matched individuals to resemble the state-wide population that makes up third-party data 603.

In the figure, test set 607 is represented as comprising 75% of the master dataset 605, and proof set 609 is represented as comprising 25% of the master dataset 605. This can be accomplished by generally assigning data to either the test set 607 or the proof set 609 via a random number generator. However, it is important that this assignment or resampling is done at random such that the test set 607 and proof set 609 are comparable populations. The figure shows a test set 607 that comprises three times as much data as proof set 609. However, this is merely an example and test set 607 and proof set 609 need not adhere to this 3:1 ratio. Test set 607 may be a subset comprising any percentage of the master dataset 605, with the proof set 609 comprising the rest of the data. However, one skilled in the art will recognize that it is advantageous for test set 607 to comprise a large portion of the master dataset 605 because only the test set 607 is used to generate the model, and the model becomes more precise as more data is used to generate it.

Once test set 607 is used to make the model 611, the model can be evaluated by applying the model to the proof set 613 in order to cross-validate the predictive capability of the model against the proof set 613, which consists of data held separately from the creation of the model in step 611. The validation is performed by ranking the proof set by predicted profitability and comparing that data to the known profit of the individual in step 615. Upon confirming the predictive capability of the model, the model can then be applied to new cohorts.

Aggregated Model

The results from the data model can be further improved by using an aggregated model that actually consists of two or more models performed sequentially. In some embodiments, both of these sub-models can be based on a segmented regression performed by the decision tree engine as described so far. In some embodiments, the two models or more are configured to predict different, but related, dependent variables. The use of the two models allows for overcoming the difficulty in separating high-loss, disaster-prone individuals from the highly-profitable individuals. This is because in practice, it is easier to give models simpler tasks. The second model can be a binary disaster model tasked with the simple job of identifying and filtering out the high-loss "disasters" from the "non-disasters", which can be performed with high accuracy. Thus, the first model is combined with an additional model designed to catch the disaster-prone customers and is preferable to having just a singular model, which may have difficulty identifying the customers who are both highly profitable and not disaster-prone.

Figure 7:
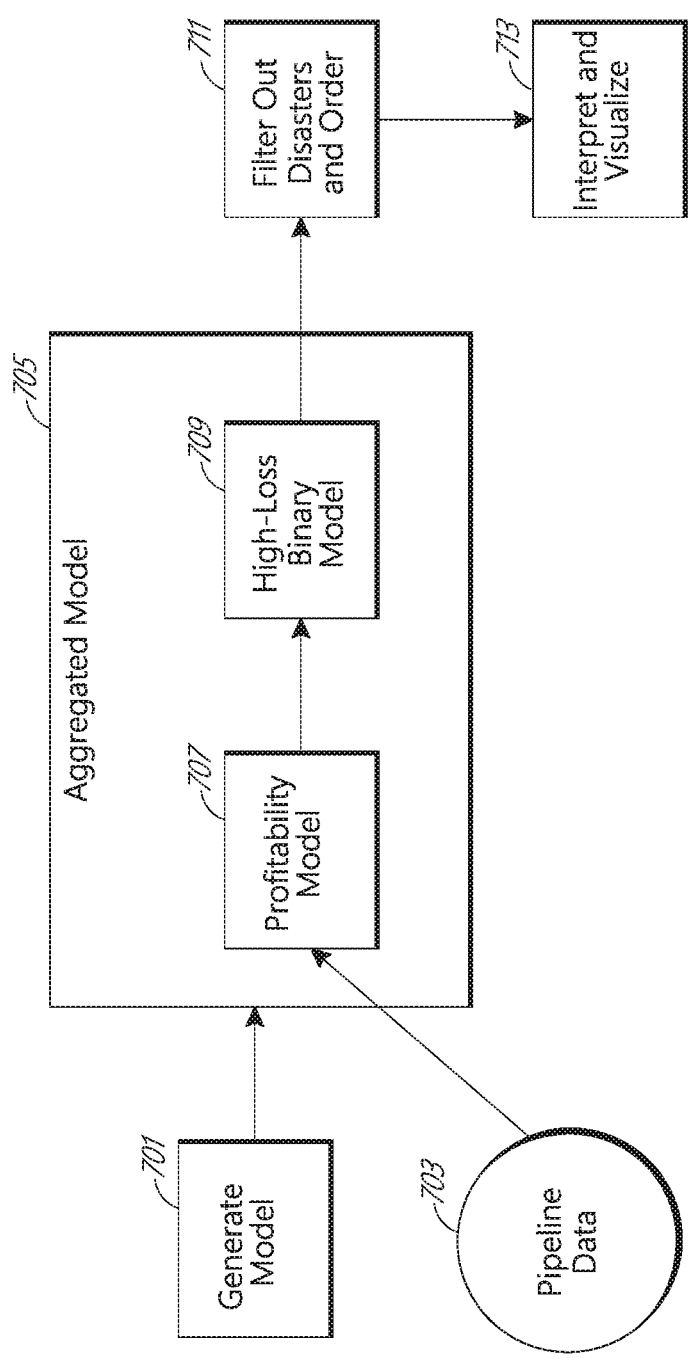
FIG. 7 illustrates one embodiment of an aggregated model consisting of two models performed sequentially.

FIG. 7 illustrates an embodiment of an aggregated model consisting of two models performed sequentially. In the figure, generating the model 701 may consist of steps already outlined in this specification, such as having the third-party and first-party data being merged into a matched set and a segmented regression being performed on a test set that is a subset of the matched set. However, in this figure the key difference is that aggregated model 705 is actually a combination of a profitability model 707 and a high-loss binary model 709.

The profitability model 707 calculates the predicted profitability of an individual. In some embodiments, profitability model 707 can be a decile profitability model designed to output predicted profitability of individuals as a decile. Profitability model 707 may also order and rank individuals based on profitability, or this may occur at step 711 as shown in the figure. After the profitability model 707 is used to calculate the overall profitability of each person, a second model can be applied to determine whether each person is a "disaster" or "non-disaster."

This second model, the high-loss binary model 709, can be an inherently probabilistic, binary model. This model could take each individual and calculate a probability or likelihood that the person would be a disaster, in order to classify the person as either a "disaster" or a "non-disaster" based on some disaster threshold.

This classification can be performed by comparing the disaster probability against an arbitrary cutoff or threshold. For example, the expected rate of disasters in a pool of individuals could be 10%. If an individual has a calculated probability of disaster of 12%, then that individual is more likely than normal to be a disaster and could be classified as a disaster. A probability under the threshold would result in the individual being classified as not a disaster. Thus, this second model classifies individuals in one of two categories, without a fine gradation.

The second model could consist of a linear regression, or segmented linear regression, that is capable of interpolating between points. By providing the model addition training sets for disasters, or more examples of what kinds of individuals fall under each classification, this model would become more precise. This model is especially effective at predicting high-loss households and disaster-prone individuals and can serve to filter the results of the profitability model 707

When using the two models together, everyone is essentially scored twice—once for profitability and again for disaster. For example, the first model would calculate the individual profitability over time for a list of customers. The second model would then determine whether each of those customers is a disaster. Some of those disaster-prone customers would be filtered out from the list at step 711, along with prioritizing the results by profitability. Thus, the end output format of the aggregated model 705 may be the same output format as profitability model 707. If the profitability model 707 outputs a profitability decile for each individual, then the aggregated model 705 may also list the profitability decile for a list of customers with some disaster-prone customers filtered out, ordered with descending profitability. Then, this list could visualized and interpreted 713 by a marketing or sales team to solicit the most profitable customers first.

Figure 8:
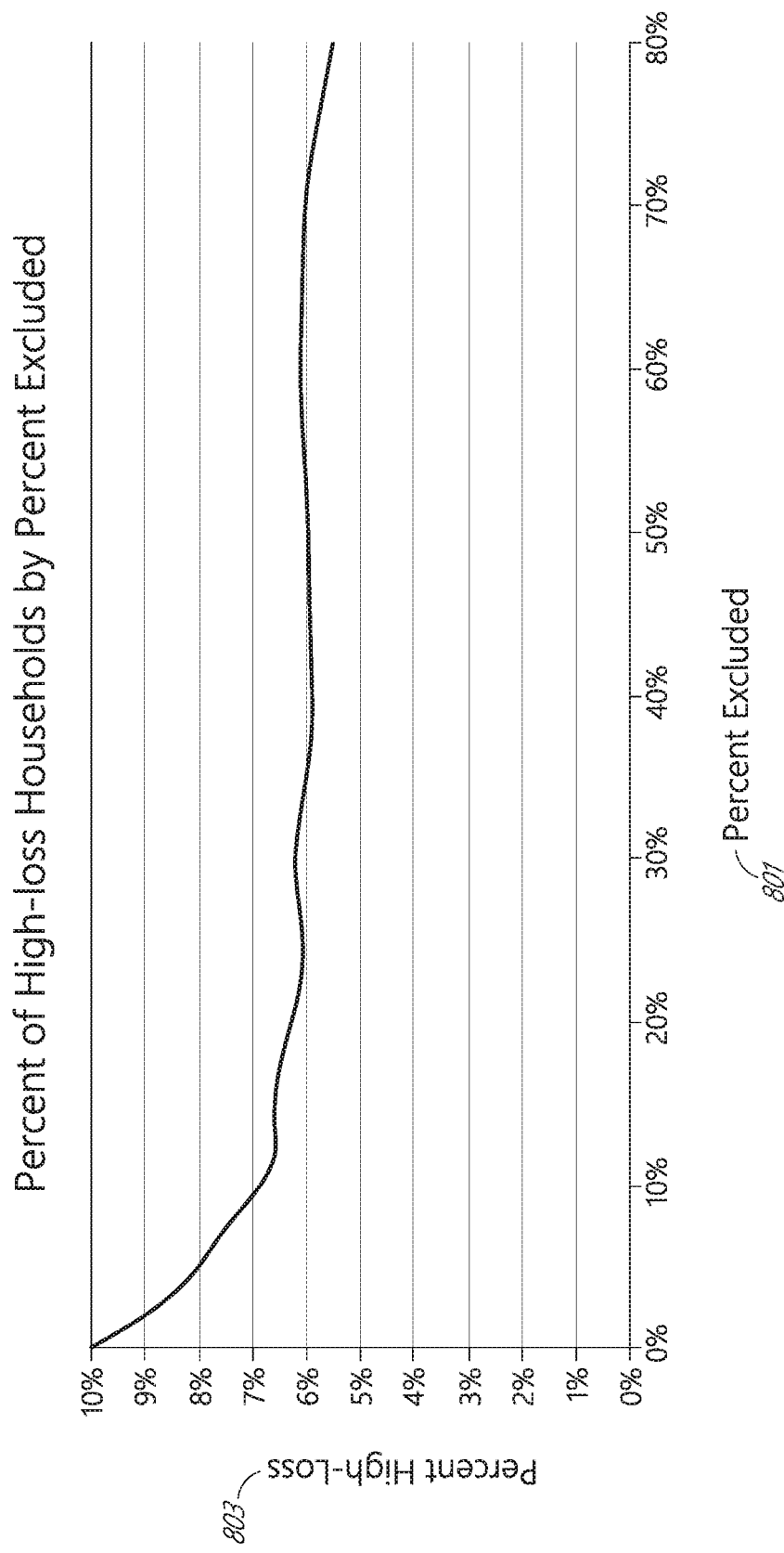
FIG. 8 illustrates a graph of how the amount of high-loss households can be reduced once identified by an aggregated data model.

FIG. 8 illustrates how using an aggregated data model can reduce the amount of high-loss households in the member base. The X-axis shows the percentage of high-loss households excluded from the results 801 against the Y-axis which shows the remaining high-loss households as a percentage of the customer base 803. As the figure shows, random targeting would result in 10% of customers being high-loss disaster cases. This is the result when not using an aggregated data model and just scoring individuals once for profitability without excluding any (corresponding to zero percent of high-loss households excluded 801 shown on the X-axis).

However, the addition of a high-loss binary model to essentially filter out some high-loss households greatly reduces the percentage amount of high-loss households in the customer base. Using the binary disaster model to filter out the worst 20% of what it considers as high-loss individuals, the actual percentage of high-loss households is reduced by 40%, with the percentage of high-loss households within the customer base going from 10% to 6%. This signifies that the binary disaster model is highly accurate in detecting disasters, which carries over to the aggregated model where the binary disaster model is used sequentially after profitability scoring. Thus, the aggregated model would preserve the same decile level profitability accuracy from the profitability scoring, but gains the 40% detection accuracy of high-loss households when flagging top 20% "high disaster risk" households as a cutoff. In other words, the aggregated model can identify 40% of incoming disaster households based on non-clinical data. This can be confirmed using the proof dataset to verify that the actual profitability is within the predicted decile for all the individuals with known profitability not used in model construction.

End Uses

Figure 9:
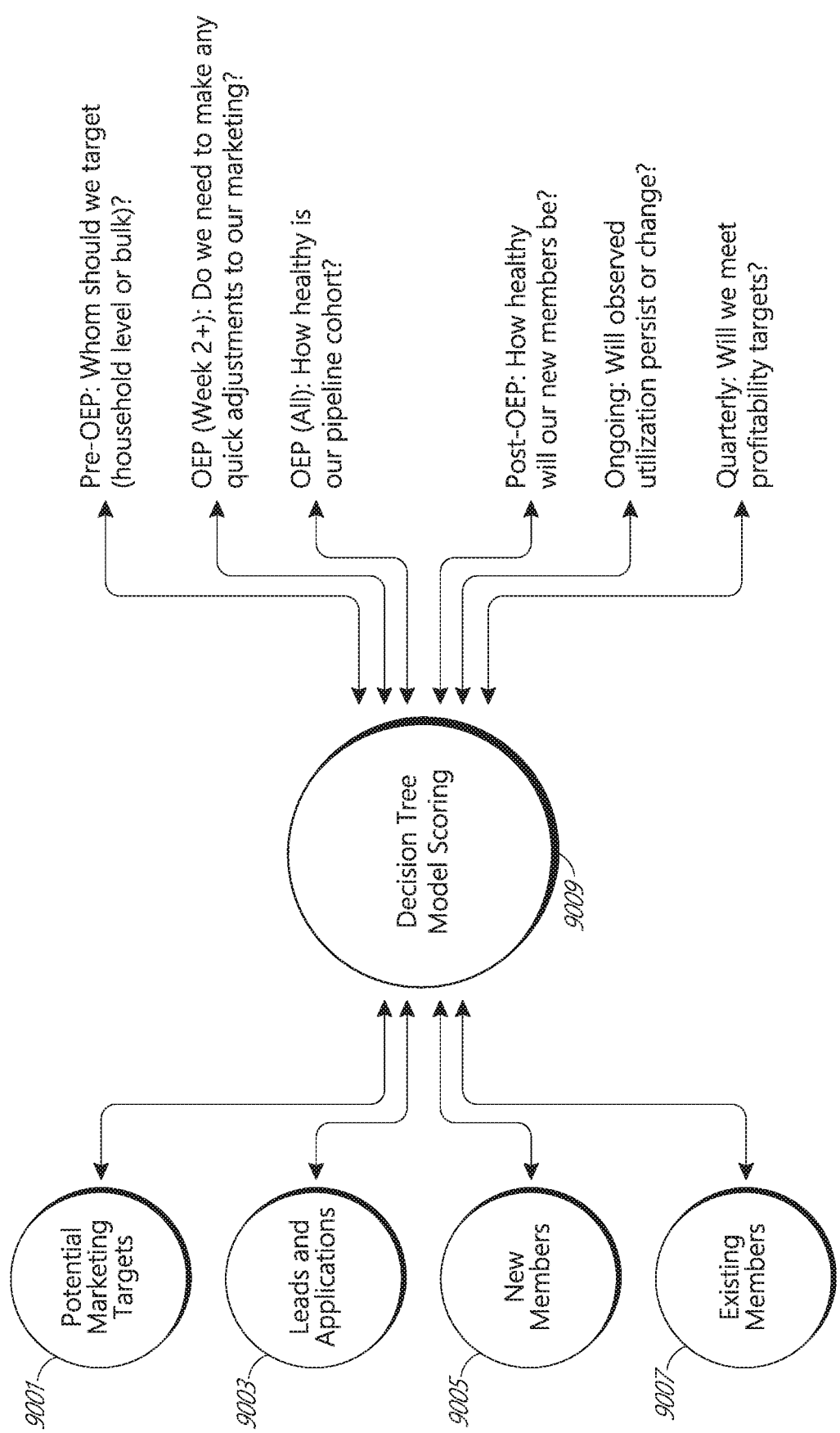
FIG. 9 illustrates a flow chart detailing how the use of non-clinical data allows for improved data model to be applied to an entire population.

FIG. 9 illustrates how the use of non-clinical data allows for the predictive data model 9009 to be applied to various cohorts in a population. It also provides a sample of some of the business questions that can be answered to show why being able to apply the model 9009 to non-existing members is so important.

The decision tree model 9009 can score and rank the profitability of all the individuals in a population, not just existing customers. This can be made possible because the model can use a state-wide, third-party database for descriptor variables (rather than just data for existing customers). Thus, various cohorts or groups of individuals that can be scored are shown in the figure, including potential marketing targets 9001, leads and applications 9003, new members 9005, and existing members 9007. If the model was generated using clinical data, then it could only be applied to existing members 9007 since that is the group that a clinical history would exist for. Thus, depending on the availability of third-party data for a given individual, the decision tree model 9009 is able to score the profitability any individual in a given population.

Furthermore, it allows model 9009 to help guide important business decisions, such as through identifying deep segmentations within the target population and their relationships to profitability. The model can be used to power a predictive dashboard or user interface that is capable of quickly evaluating pipeline profitability, such as leads or new insurance subscribers. This model can be used to guide marketing or sales efforts by defining or prioritizing target populations at the household level in order to acquire new customers. In other words, once individuals are ordered based on overall profitability, marketing or sales efforts can be directed towards the most profitable individuals in the population. The model can be used to anticipate members or existing customers at risk for disease progression, so that care management can be recommended to them. The model can be used to predict churn risk at the household level, so that more sustainable insurance products or policies can be recommended.

Additional key business questions that can be answered are provided in FIG. 9. These questions include: whether targeting should occur at the household level or bulk, whether any quick adjustments need to be made to the marketing, how healthy the pipeline cohort is, how healthy new members will be, whether observed utilization will persist or change, and whether the company will meet profitability targets for the quarter.

Figure 10:
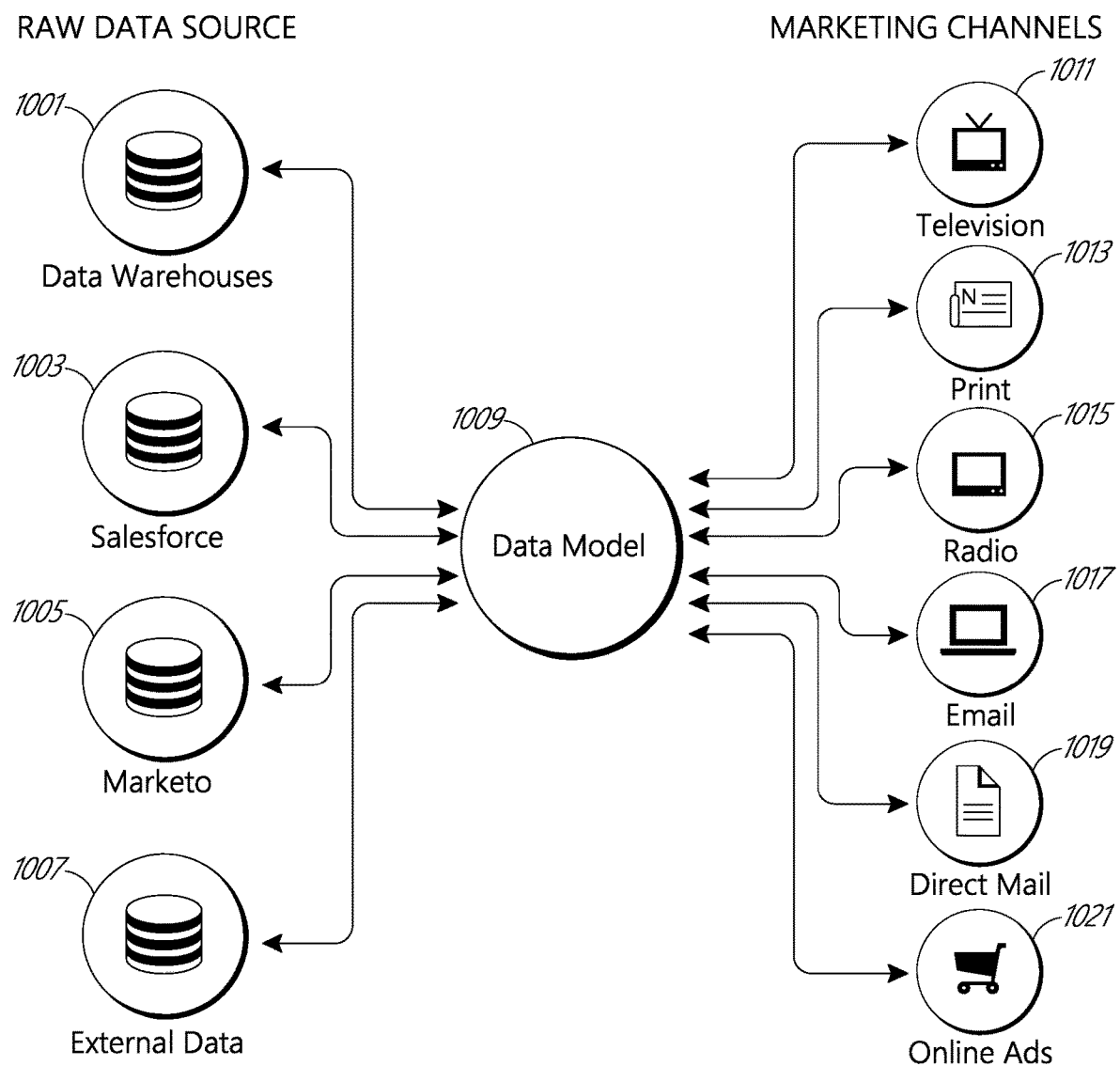
FIG. 10 illustrates a flowchart depicting the various data sources and marketing channels configured for use with the improved data model according to one embodiment.

FIG. 10 illustrates some of the various data sources for the model 1009 and various marketing channels that can be powered by the model 1009. To supply the data for the cohorts or the different types of individuals, the data can be sourced from data warehouses 1001, which can be central repositories of integrated data from one or more disparate sources. The data may comprise external data 1007, which may exist on a physical medium such as a hard drive or optical disc. The data may also comprise data in an intangible format such as data stored on a cloud service. Another data source may be Salesforce data 1003, or data from a similar provider of customer relationship management products. Another data source may be Marketo data 1005, or a similar provider of marketing automation software or marketing management software.

The model 1009 can be applied to data from these various sources, and the results can be leveraged by tools to perform an action or business function. As just one example, the model results can be used to power different marketing channels, such as television 1011, print 1013, radio 1015, email 1017, direct mail 1019, and online ads 1021. The model can be used with tools in order to optimize the marketing for member targeting and conversion. For example, the model could sort all the households in a neighborhood by profitability and be configured to target the top 80% of households by profitability, a threshold which may be set by user preference. A targeted advertisement could be then delivered to those households. The specific product, advertisement, marketing channel, etc. could be selected based on the characteristics of the household or the individuals in a household. For example, if a household has a relatively young average age then an insurance product attractive to a younger demographic could be marketed to that household via an advertisement and channel that resonates with a younger demographic, such as email or online advertisement.

Figure 11:
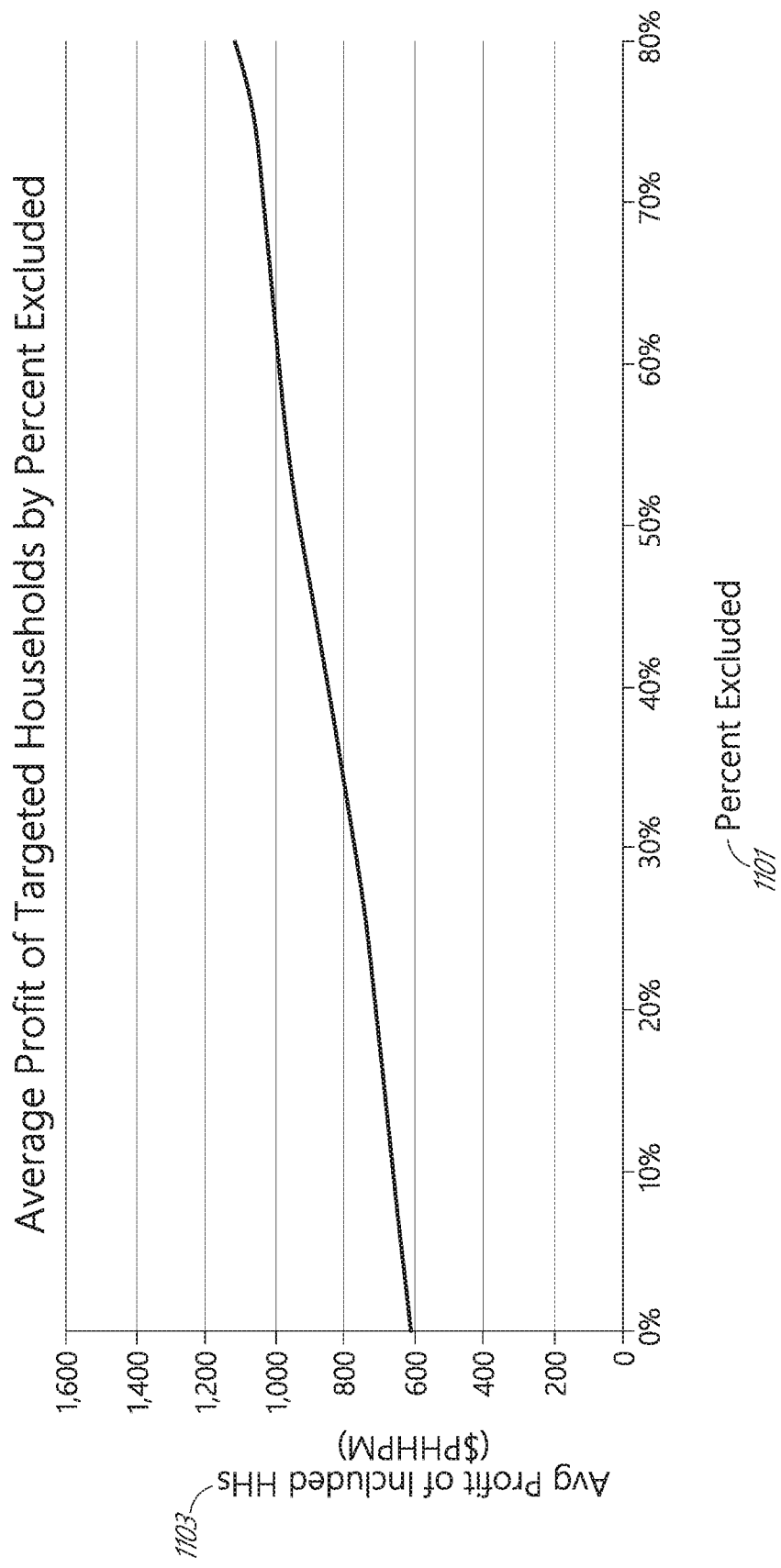
FIG. 11 illustrates a graph showing how the improved data model can be used to identify predicted lower-profit households for exclusion, suppression, or other mitigation strategy.

FIG. 11 is a graph that illustrates an example of how the predictive data model can be used to help exclude predicted lower-profit households in order to achieve improved profitability from the remaining targeted households. The X-axis represents the percentage of low-profit households excluded 1101, and the Y-axis represents the average profit of the included households 1103 as a dollar amount. The graph shows that the average profitability steadily increases with a tighter targeting of households from excluding the lowest-profit households first. The model is used to rank household profitability, order the households based on profitability, and exclude the bottom 50% of households by profitability. The result is that the average profit from the remaining households increases about 50% from $600 to approximately $900. The plot of FIG. 11 may also be an evaluation tool, or method of evaluating the performance of a regression model in terms that are intuitive to a business executive, as making machine learning model performance interpretable is generally considered difficult. If the plot shows a linear relationship on out-of-sample testing, such as the linear relationship shown in FIG. 11, the model is considered to be predictive. If the plot is instead a flat, horizontal line such that the Y-axis showing the average profit of targeted households remains constant, then the model is considered to have failed. Evaluation tools exist for classification, rather than regression, and those are also difficult to interpret.

Figure 12:
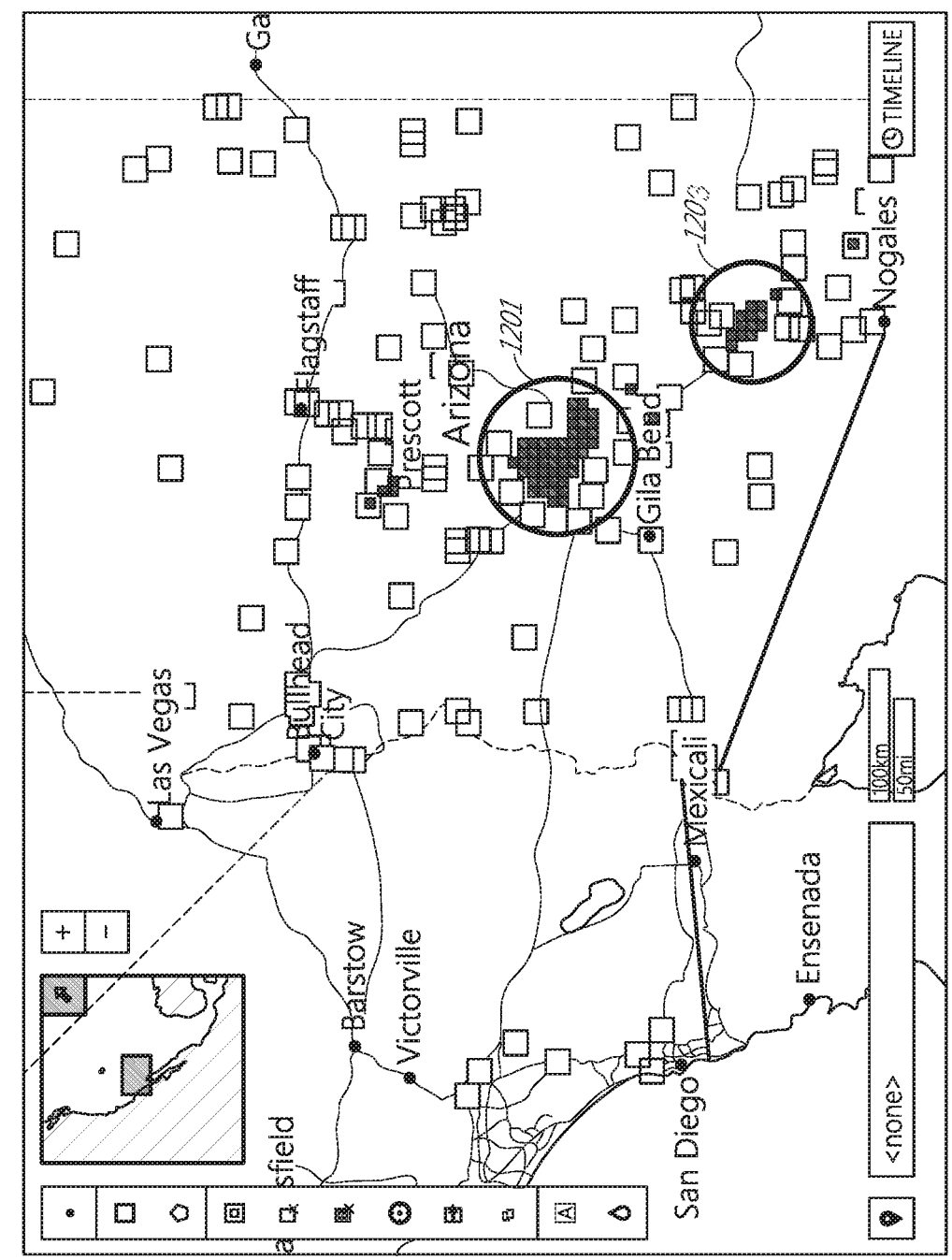
FIG. 12 illustrates how third-party data containing the addresses of individuals can be used with the aggregate data model in order to provide a user interface or map visualization according to one embodiment.

FIG. 12 illustrates how third-party data containing the addresses of individuals can be used with the aggregate data model in order to provide a user interface or map visualization with a house-by-house resolution. In some cases, the third party data used by the system may already contain demographics data such as the addresses of individuals. Thus, the profitability of individuals or households can be presented on a map based on the corresponding address or location of that individual or household. Alternatively, the profitability of entire neighborhoods can be presented on the map based on the profitability of that neighborhood's constituent households and the corresponding location of that neighborhood.

In some embodiments, the method of presenting this information may involve resolving the profitability against buckets of profitability ranges, and then assigning a color to the graphical representation of an individual, household, or neighborhood's profitability based on the profitability range. For example, an extremely profitable neighborhood may be visually represented on the map as a green icon or dot.

In some embodiments, the profitability of all the individuals or households in an entire neighborhood may be visually presented on the map. There may be one or more neighborhoods represented on the map or user interface. These neighborhoods may cluster around each other to form one or more cities. This will allow a user of the system to quickly see differences between the profitability of various neighborhoods. The user of the system could leverage this capability to engage in marketing campaigns for the more profitable neighborhoods, such as by putting up a billboard within the neighborhood. The user could also do further research on what makes specific neighborhoods more profitable than other neighborhoods, or what descriptor variables are causing the differences. The user could also do further research on the distinguishing characteristics between cities.

For example, FIG. 12 shows graphical profitability representations for two cities, first city 1201 and second city 1203. Each city is comprised of tiled representations of individual neighborhoods. In this embodiment, a user can look at the overall colors for first city 1201 and second city 1203 to quickly determine which city is more profitable. Within each city, a user can also compare different neighborhoods.

As a further example, the user might see two adjacent neighborhoods with greatly different overall profitability and decide to do additional research on these two specific neighborhoods to try and account for the difference. The user might then then realize that the median age in the more profitable neighborhood is significantly higher than the less profitable, adjacent neighborhood. With this information, the more profitable neighborhood could be prioritized first for soliciting new customers. Additionally, the marketing strategy or solicitation method may be specifically chosen to target the characteristics of that neighborhood. For example, advertisements in public spaces—billboards, posters, etc.—could be designed to target a younger audience in the less profitable neighborhood and designed to target an older audience in the more profitable neighborhood.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface (GUI), among other things.

Figure 13:
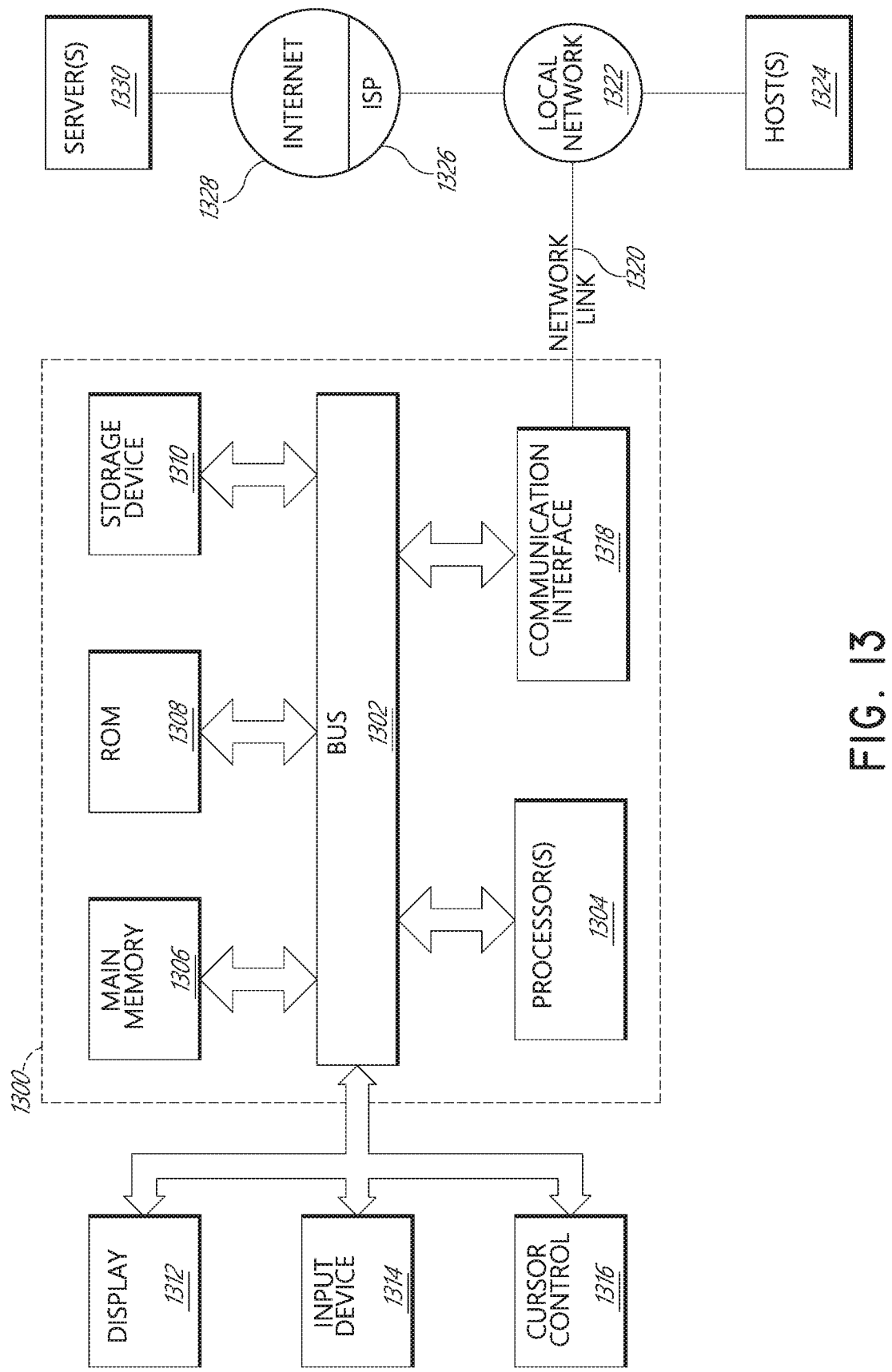
FIG. 13 illustrates one embodiment of a computer system with which certain methods discussed herein may be implemented.

For example, FIG. 13 is a block diagram that illustrates a computer system 1300 upon which an embodiment may be implemented. A computing device may be used to process the various data, generate the data model, test the data model, apply the data model, and interpret or present the results visually to an end user. The computing device may include some or all of the components and/or functionality of the computer system 1300.

Computer system 1300 includes a bus 1302 or other communication mechanism for communicating information, and a hardware processor, or multiple processors, 1304 coupled with bus 1302 for processing information. Hardware processor(s) 1304 may be, for example, one or more general purpose microprocessors.

Computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), and so forth, is provided and coupled to bus 1302 for storing information and instructions.

Computer system 800 may be coupled via bus 1302 to a display 1312, such as a cathode ray tube (CRT) or LCD display (or touch screen), for displaying information to a computer user. An input device 1314, including alphanumeric and other keys, is coupled to bus 1302 for communicating information and command selections to processor 1304. Another type of user input device is cursor control 816, such as a mouse, a trackball, or cursor direction keys for communicating direction information and command selections to processor 1304 and for controlling cursor movement on display 1312. This input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions included in main memory 1306. Such instructions may be read into main memory 1306 from another storage medium, such as storage device 1310. Execution of the sequences of instructions included in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may retrieve and execute the instructions. The instructions received by main memory 1306 may optionally be stored on storage device 810 either before or after execution by processor 804.

Computer system 1300 also includes a communication interface 1318 coupled to bus 1302. Communication interface 1318 provides a two-way data communication coupling to a network link 820 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to communicate with a WAN). Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. And the inventions illustratively disclosed herein suitably may be practiced in the absence of any element which is not specifically disclosed herein. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
one or more data stores storing:
a first dataset including first data items associated with respective individuals of a first plurality of individuals; and
a second dataset including second data items associated with respective individuals of at least some of the first plurality of individuals;
a computer processor; and
a computer readable storage medium storing program instructions configured for execution by the computer processor to cause the computing system to:
perform a fuzzy match between the first dataset and the second dataset to identify a plurality of overlapping individuals associated with both the first dataset and the second dataset;
generate a training data set including data items from the first and second data sets associated with at least some of the plurality of overlapping individuals;
train, based on at least a subset of the training dataset, a first predictive model configured to determine a predicted profitability of an individual;
train, based on at least the subset of the training dataset, a second predictive model configured to determine a predicted likelihood of disaster of an individual;
access a third dataset including third data items associated with a second plurality of individuals;
apply the first predictive model to the third dataset to determine predicted profitabilities of respective individuals of the second plurality of individuals;
apply the second predictive model to the third dataset to determine predicted likelihoods of disaster of respective individuals of the second plurality of individuals;
filter, based on the predicted likelihoods of disaster of respective individuals of the second plurality of individuals, the third dataset to determine a subset of the second plurality of individuals that are unlikely to experience a disaster; and
sort the subset of the second plurality of individuals based the predicted profitabilities of the respective individuals.

2. The computing system of claim 1, wherein the first data items in the first dataset comprise demographic data, geographic data, and/or behavioral data associated with respective individuals of the first plurality of individuals.

3. The computing system of claim 1, wherein training the first predictive model further comprises using a decision tree algorithm to perform a segmented linear regression on the subset of the training dataset, and wherein training the second predictive model further comprising using a decision tree algorithm to perform a segmented linear regression on the subset of the training dataset.

4. The computing system of claim 1, wherein the third data items in the third dataset comprise demographic data, geographical data, or behavioral data associated with the second plurality of individuals.

5. The computing system of claim 1, wherein the plurality of overlapping individuals of the training dataset is fewer individuals than the first plurality of individuals in the first dataset.

6. The computing system of claim 1, wherein performing a fuzzy-match between the first dataset and the second dataset to identify a plurality of overlapping individuals further comprises comparing an identifier of each individual in the first dataset to an identifier of each individual in the second dataset.

7. The computing system of claim 6, wherein the identifier comprises at least one of: a name associated with an individual, an address associated with an individual, a postal code associated with an individual, and a phone number associated with an individual.

8. The computing system of claim 1, wherein the subset of the training dataset is greater than half of the data items in the training dataset.

9. The computing system of claim 1, wherein the second predictive model is a high-loss binary model.

10. The computing system of claim 1, wherein the second predictive model is further configured to use the predicted likelihood of disaster of an individual in order to classify each individual as either a high-loss individual or a small-loss individual.

11. The computing system of claim 9, wherein the second predictive model is further configured to calculate the average likelihood of disaster in a group of individuals and compare it to the predicted likelihood of disaster of an individual in order to classify the individual as either a high-loss individual or a small-loss individual.

12. The computing system of claim 1, wherein the first predictive model is further configured to determine a predicted profitability of an individual using demographic data, geographical data, and/or behavioral data associated with the individual.

13. The computing system of claim 10, wherein individuals classified as small-loss individuals are unlikely to experience a disaster, and wherein individuals classified as high-loss individuals are likely to experience a disaster.

14. The computing system of claim 13, wherein filtering the third dataset to determine a subset of the second plurality of individuals that are unlikely to experience a disaster further comprises: determining a subset of the second plurality of individuals that are classified as high-loss individuals and likely to experience a disaster and removing that subset of high-loss individuals from the second plurality of individuals.

15. The computing system of claim 1, wherein performing a fuzzy match between the first dataset and the second dataset further comprises normalizing values of the first data items of the first dataset to be within zero and one.

16. The computing system of claim 1, wherein the program instructions are further configured for execution by the computer processor to cause the computing system to:
sort the subset of the second plurality of individuals into a plurality of profitability ranges based the predicted profitabilities of the respective individuals.

17. The computing system of claim 16, wherein the program instructions are further configured for execution by the computer processor to cause the computing system to:
generate data useable for rendering a user interface including a map that visually presents, on the map:
a map of a geographical region associated with the second plurality of individuals; and
a plurality of tiles overlaid on the map, wherein each tile is associated with a respective individual of the second plurality of individuals, and wherein each tile is colored based on the profitability range that the predicted profitability of the respective individual is in.

18. The computing system of claim 1, wherein the program instructions are further configured for execution by the computer processor to cause the computing system to:

generate data useable for rendering a user interface including a map that visually presents, on the map, a predicted profitability of at least one individual of the subset of the second plurality of individuals based on a corresponding address or location of the at least one individual.

19. The computing system of claim 18, wherein the program instructions are further configured for execution by the computer processor to cause the computing system to:

generate data useable for rendering a user interface including a plot including:

one or more data stores storing:

a Y-axis representing an average of the predicted profitabilities of the subset of the second plurality of individuals that are small-loss individuals and unlikely to experience a disaster; and an X-axis representing a percentage of individuals of the second plurality of individuals that have been classified as high-loss individuals and filtered from the second plurality of individuals.

20. A computer-implemented method comprising:

performing a fuzzy match between a first dataset and a second dataset to identify a plurality of overlapping individuals associated with both the first dataset and the second dataset, wherein the first dataset includes first data items associated with respective individuals of a first plurality of individuals, and wherein the second dataset includes second data items associated with respective individuals of at least some of the first plurality of individuals;

generating a training data set including data items from the first and second data sets associated with at least some of the plurality of overlapping individuals;

training, based on at least a subset of the training dataset, a first predictive model configured to determine a predicted profitability of an individual;

training, based on at least the subset of the training dataset, a second predictive model configured to determine a predicted likelihood of disaster of an individual;

accessing a third dataset including third data items associated with a second plurality of individuals;

applying the first predictive model to the third dataset to determine predicted profitabilities of respective individuals of the second plurality of individuals;

applying the second predictive model to the third dataset to determine predicted likelihoods of disaster of respective individuals of the second plurality of individuals;

filtering, based on the predicted likelihoods of disaster of respective individuals of the second plurality of individuals, the third dataset to determine a subset of the second plurality of individuals that are unlikely to experience a disaster; and sorting the subset of the second plurality of individuals based the predicted profitabilities of the respective individuals.

* * * * *